US012689819B2

(12) United States Patent  (10) Patent No.: US 12,689,819 B2
Iwakiri  (45) Date of Patent: Jul. 21, 2026

(54) DISPLAY CONTROL APPARATUS, DISPLAY CONTROL METHOD, AND COMPUTER-READABLE STORAGE MEDIUM

(71) Applicant: CANON KABUSHIKI KAISHA, Tokyo (JP)

(72) Inventor: Yoshiki Iwakiri, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 257 days.

(21) Appl. No.: 18/607,610

(22) Filed: Mar. 18, 2024

(65) Prior Publication Data

US 2024/0323513 A1     Sep. 26, 2024

(30) Foreign Application Priority Data

Mar. 24, 2023    (JP) ................................. 2023-048617

(51) Int. Cl.
| | |
|---|---|
| *H04N 23/62* | (2023.01) |
| *G06T 15/20* | (2011.01) |
| *G06T 17/00* | (2006.01) |
| *H04N 23/66* | (2023.01) |
| *H04N 13/296* | (2018.01) |

(52) U.S. Cl.
CPC ............. *H04N 23/62* (2023.01); *G06T 15/20* (2013.01); *G06T 17/00* (2013.01); *H04N 23/66* (2023.01); *G06T 2200/24* (2013.01); *H04N 13/296* (2018.05)

(58) Field of Classification Search
None
See application file for complete search history.

(56) References Cited

U.S. PATENT DOCUMENTS

| | | | |
|---|---|---|---|
| 11,627,256 B2 | 4/2023 | Iwakiri | |
| 2006/0199734 A1* | 9/2006 | Yamashita | ............. H04N 7/181 |
| | | | 348/E7.086 |

(Continued)

FOREIGN PATENT DOCUMENTS

| | | | | |
|---|---|---|---|---|
| EP | 3413570 A1 * | 12/2018 | ....... | G08B 13/19608 |
| EP | 3618429 A1 | 3/2020 | | |

(Continued)

OTHER PUBLICATIONS

Office Action issued by the European Patent Office on Oct. 14, 2025 in corresponding EP Patent Application No. 24164101.8.

(Continued)

*Primary Examiner* — James M Anderson, II
(74) *Attorney, Agent, or Firm* — Carter, DeLuca & Farrell LLP

(57) ABSTRACT
A display control apparatus generates a user interface (UI) image indicating a system including a plurality of image capturing apparatuses, the image being displayed such that information indicating not less than two image capturing apparatuses, of the plurality of image capturing apparatuses, which perform a predetermined cooperative operation is different in a form from information indicating an image capturing apparatus, of the plurality of image capturing apparatuses, which does not perform the predetermined cooperative operation, and performs control to cause a display to display the image.

18 Claims, 17 Drawing Sheets

(56)　　　　　References Cited

U.S. PATENT DOCUMENTS

| | | | |
|---|---|---|---|
| 2016/0378301 A1* | 12/2016 | Hirakawa | G06F 3/0482 |
| | | | 715/815 |
| 2020/0177842 A1* | 6/2020 | Golan | H04N 7/181 |
| 2023/0026038 A1 | 1/2023 | Iwakiri | |
| 2023/0209180 A1 | 6/2023 | Iwakiri | |

FOREIGN PATENT DOCUMENTS

| | | |
|---|---|---|
| JP | 2008-015863 A | 1/2008 |
| JP | 2019-088025 A | 6/2019 |

OTHER PUBLICATIONS

Extended European Search Report issued by the European Patent Office on Jul. 31, 2024 in corresponding EP Patent Application No. 24164101.8.

* cited by examiner

F I G.  1
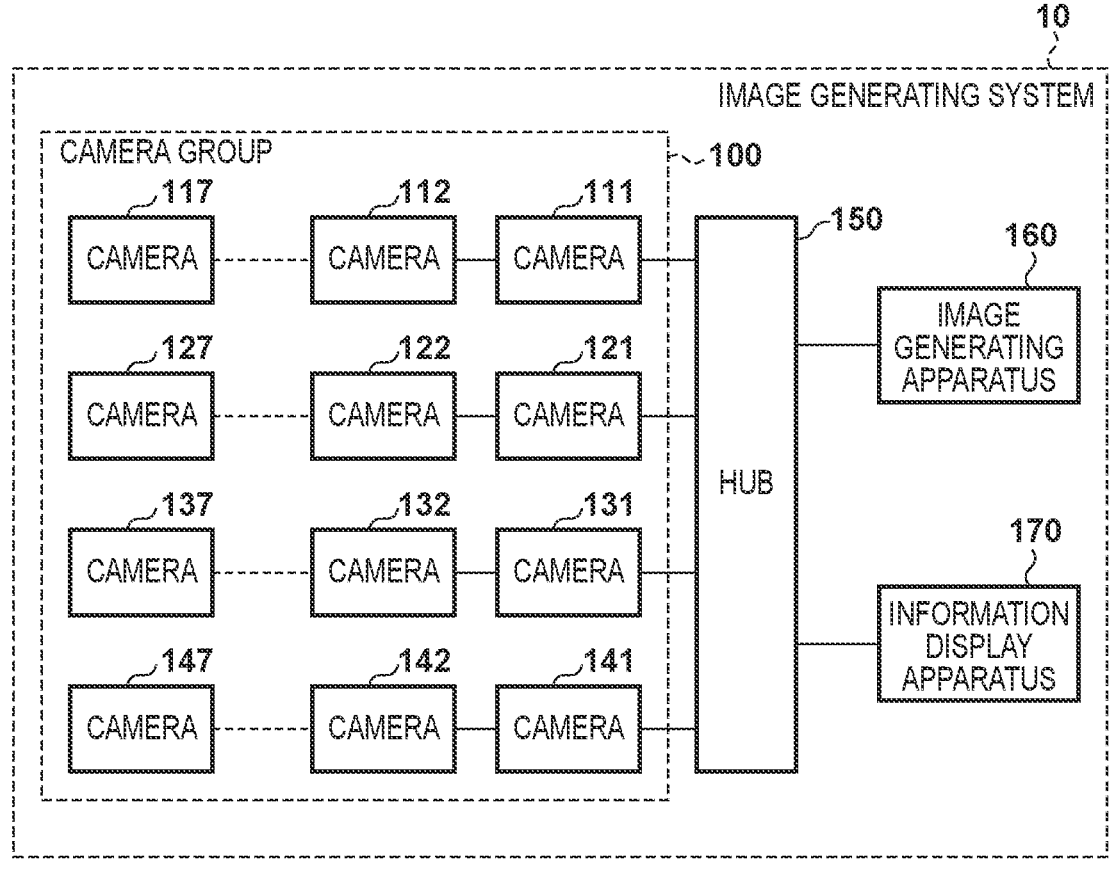

F I G. 3
170
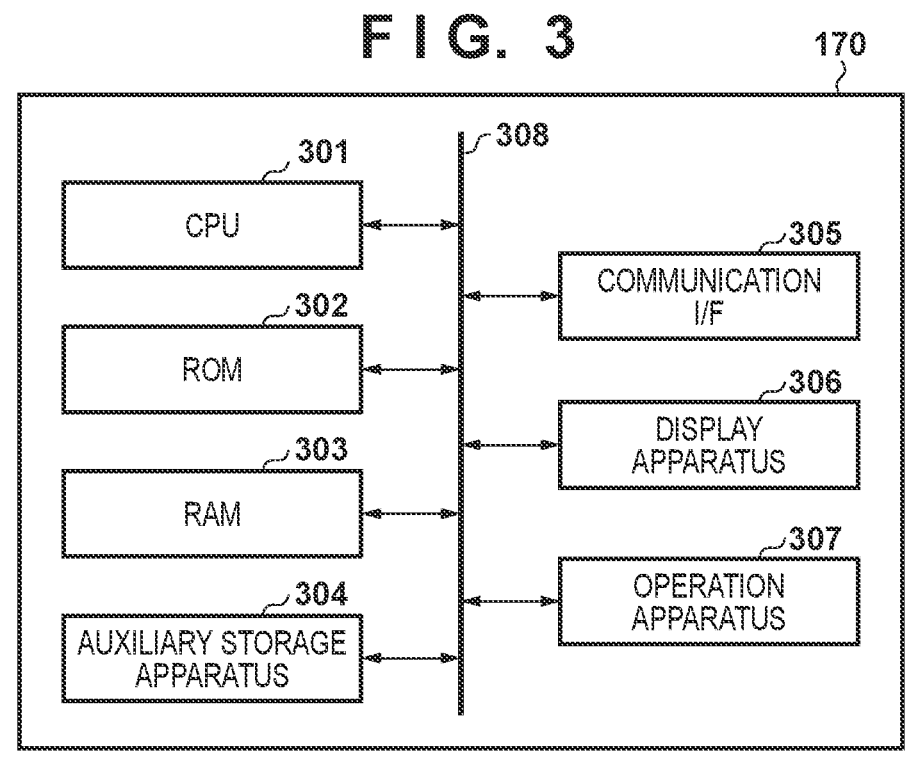
F I G. 4
170
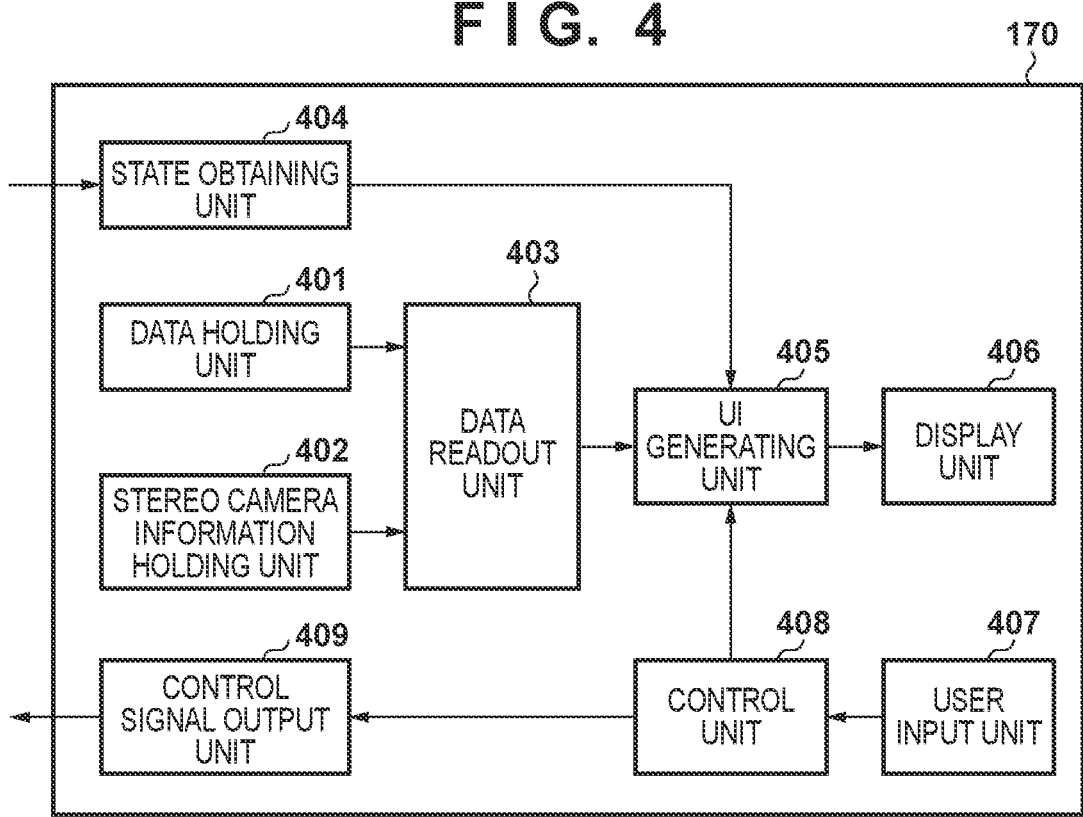

F I G. 5

| IDENTIFICATION INFORMATION | CONNECTION GROUP INFORMATION | CONNECTION DESTINATION | INSTALLATION POSITION |
|---|---|---|---|
| CAMERA 111 | L1 | HUB | x11, y11 |
| CAMERA 112 | L1 | CAMERA 111 | x12, y12 |
| CAMERA 113 | L1 | CAMERA 112 | x13, y13 |
| CAMERA 114 | L1 | CAMERA 113 | x14, y14 |
| CAMERA 115 | L1 | CAMERA 114 | x15, y15 |
| CAMERA 116 | L1 | CAMERA 115 | x16, y16 |
| CAMERA 117 | L1 | CAMERA 116 | x17, y17 |
| CAMERA 121 | L2 | HUB | x21, y21 |
| CAMERA 122 | L2 | CAMERA 121 | x22, y22 |
| ... | ... | ... | ... |

F I G. 6

| STEREO CAMERA ID | IDENTIFICATION INFORMATION 1 | IDENTIFICATION INFORMATION 2 | IDENTIFICATION INFORMATION 3 |
|---|---|---|---|
| StrCam1 | CAMERA 112 | CAMERA 131 | – |
| StrCam2 | CAMERA 111 | CAMERA 121 | CAMERA 141 |
| ... | ... | ... | ... |

FIG. 8

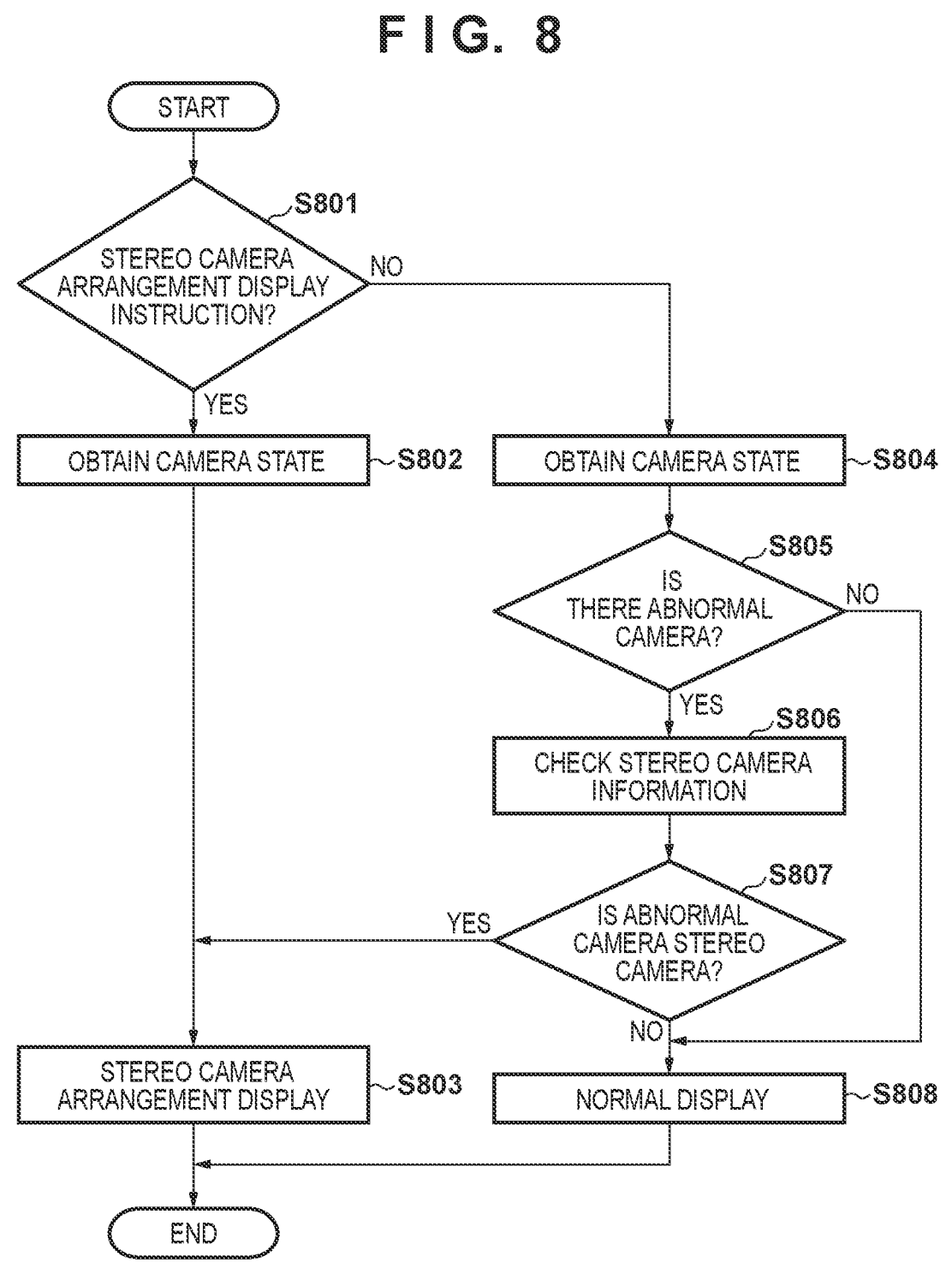

START

S801

STEREO CAMERA ARRANGEMENT DISPLAY INSTRUCTION?

NO

YES

OBTAIN CAMERA STATE ~S802

OBTAIN CAMERA STATE ~S804

S805

IS THERE ABNORMAL CAMERA?

NO

YES

CHECK STEREO CAMERA INFORMATION ~S806

S807

IS ABNORMAL CAMERA STEREO CAMERA?

YES

NO

STEREO CAMERA ARRANGEMENT DISPLAY ~S803

NORMAL DISPLAY ~S808

END

F I G.  9
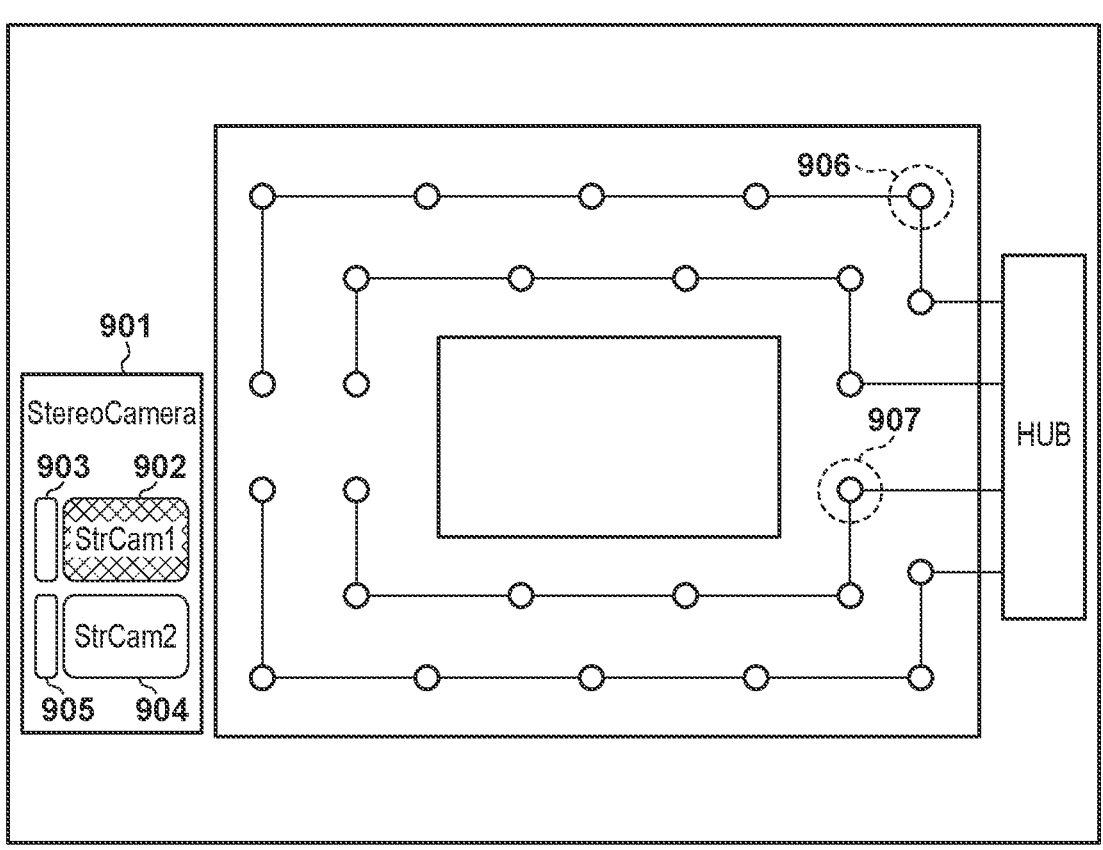

F I G. 10
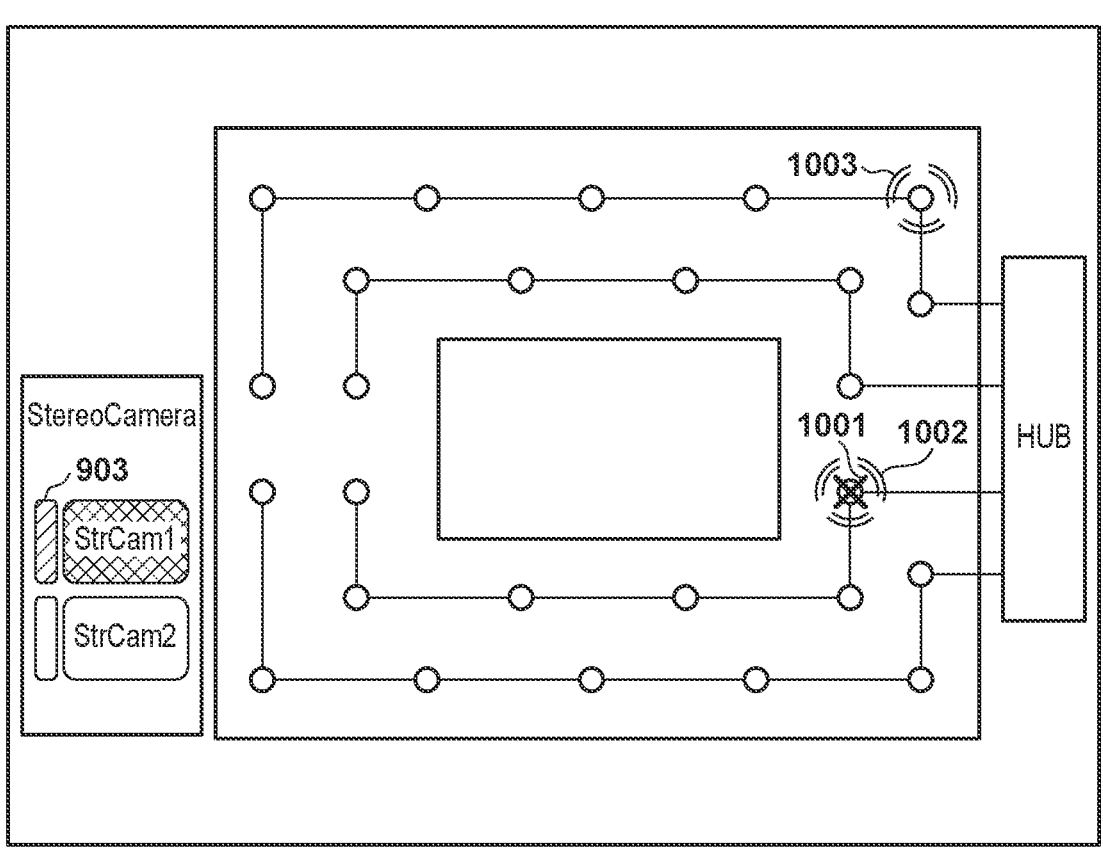

F I G. 11
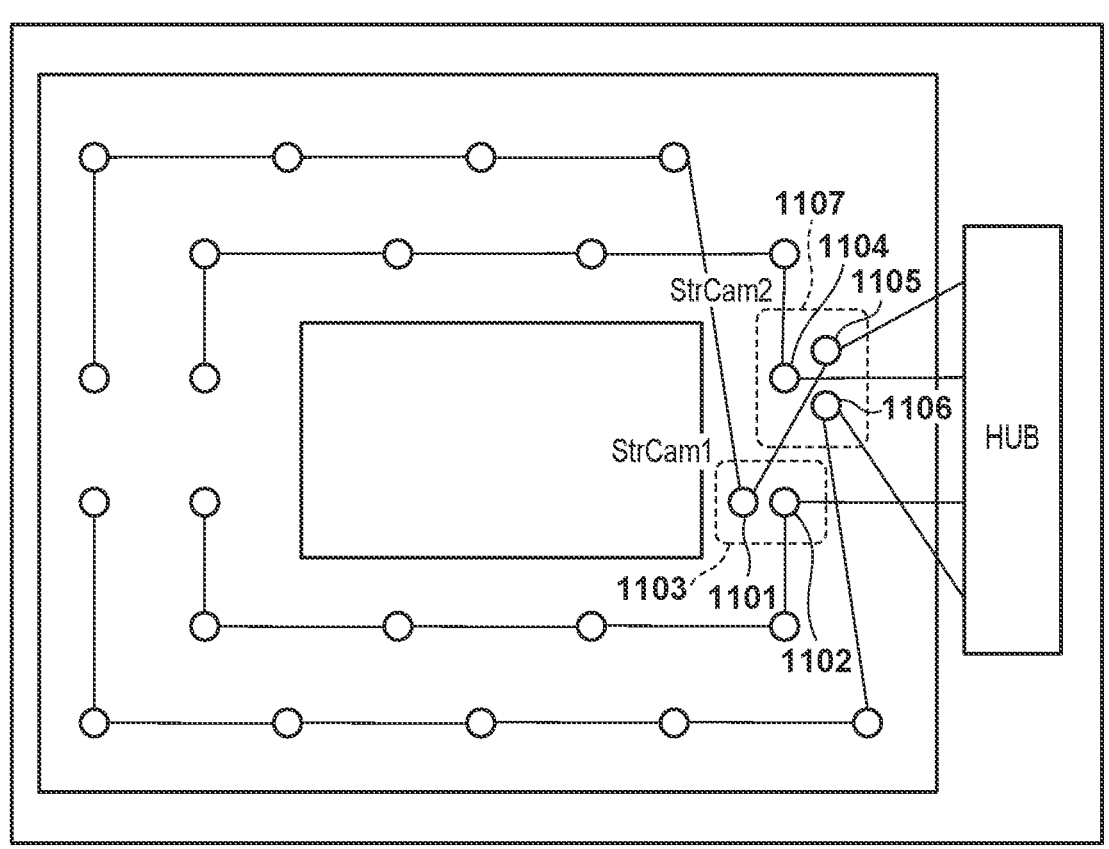

F I G. 12
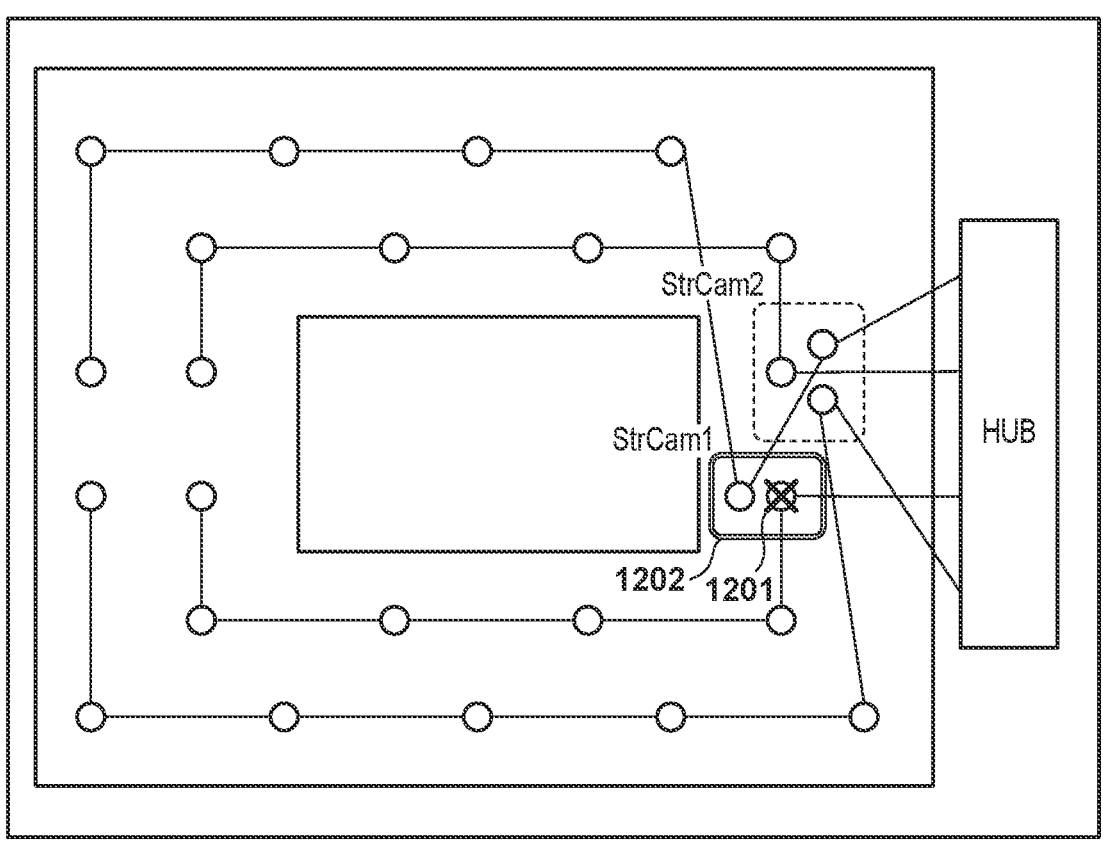

F I G. 13
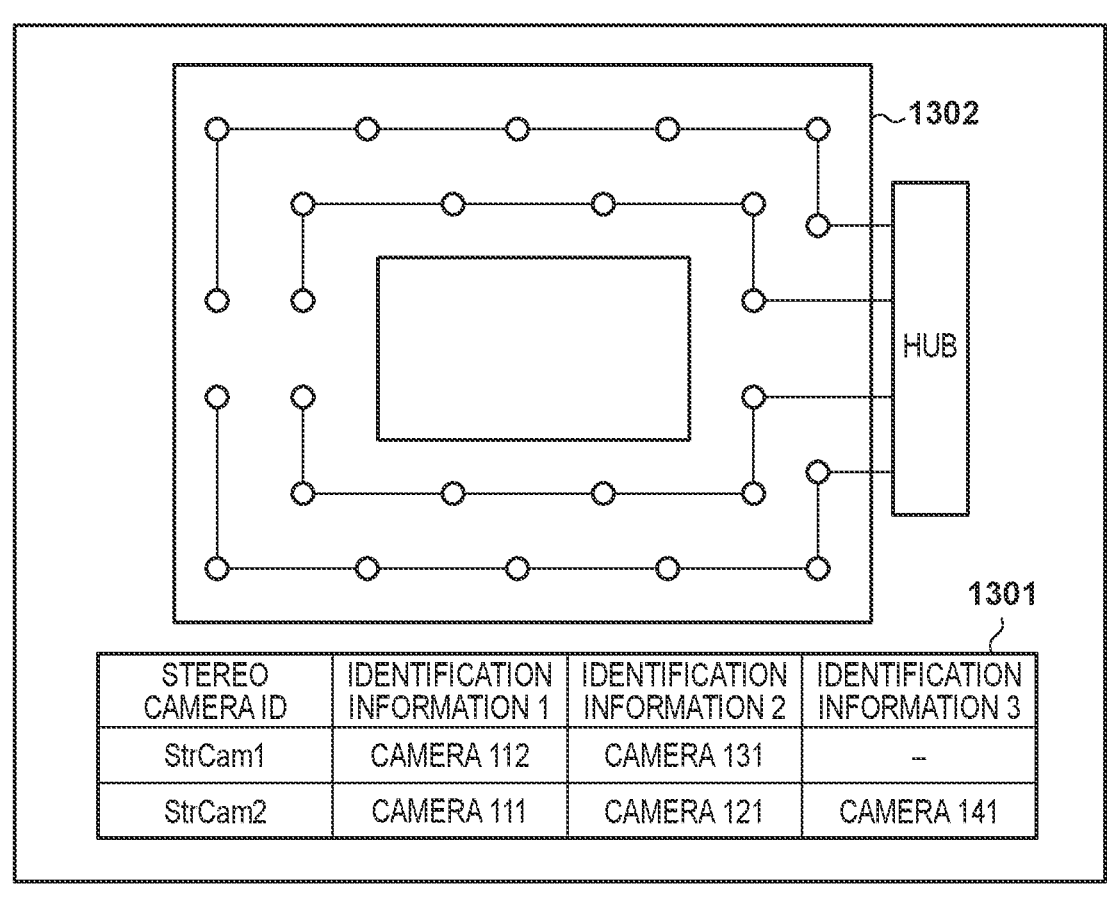
| STEREO CAMERA ID | IDENTIFICATION INFORMATION 1 | IDENTIFICATION INFORMATION 2 | IDENTIFICATION INFORMATION 3 |
|---|---|---|---|
| StrCam1 | CAMERA 112 | CAMERA 131 | – |
| StrCam2 | CAMERA 111 | CAMERA 121 | CAMERA 141 |

| STEREO CAMERA ID | IDENTIFICATION INFORMATION 1 | IDENTIFICATION INFORMATION 2 | IDENTIFICATION INFORMATION 3 |
|---|---|---|---|
| StrCam1 | CAMERA 112 | CAMERA 131 | — |
| StrCam2 | CAMERA 111 | CAMERA 121 | CAMERA 141 |

F I G.  15
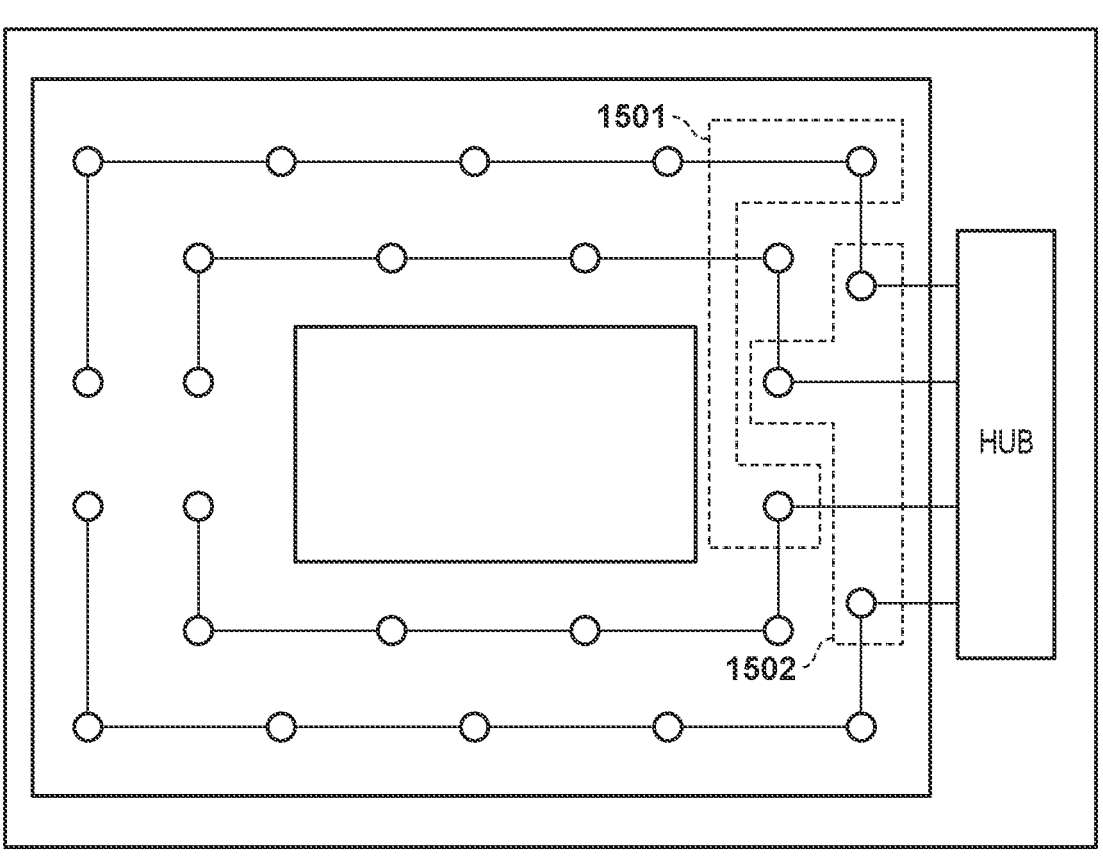

F I G.  16
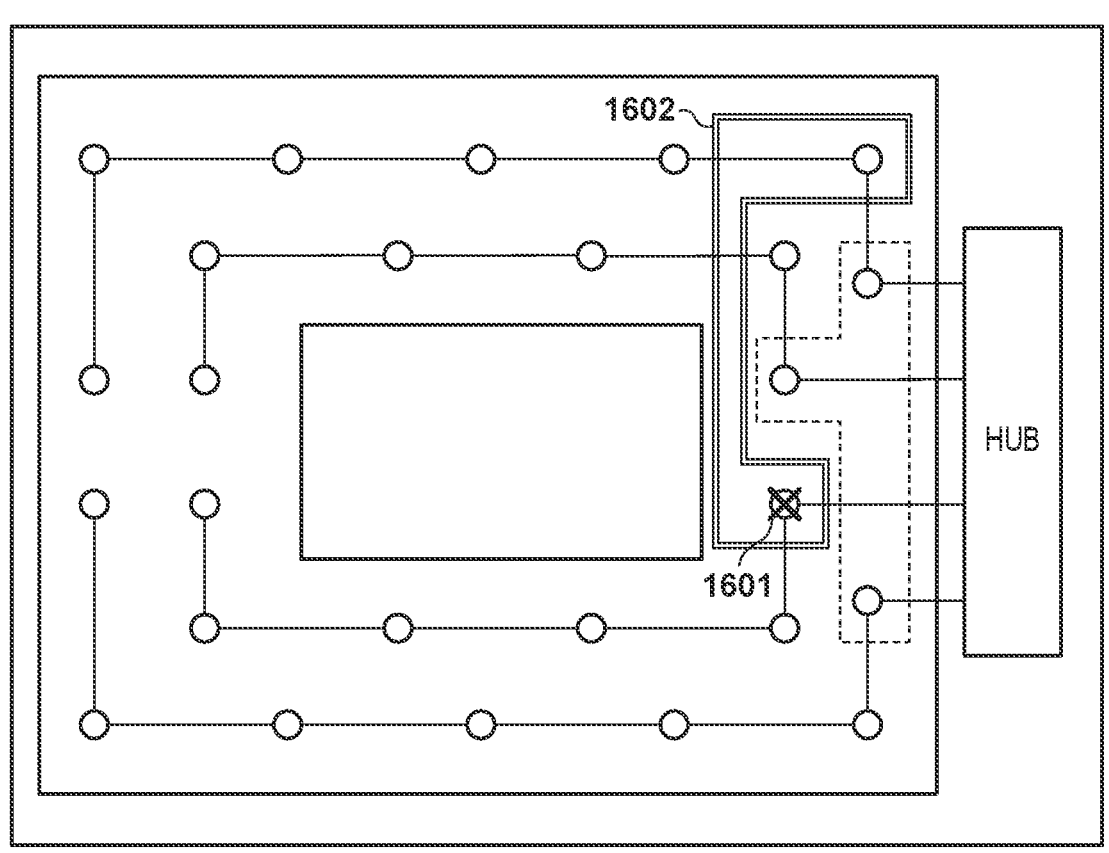

F I G.  17
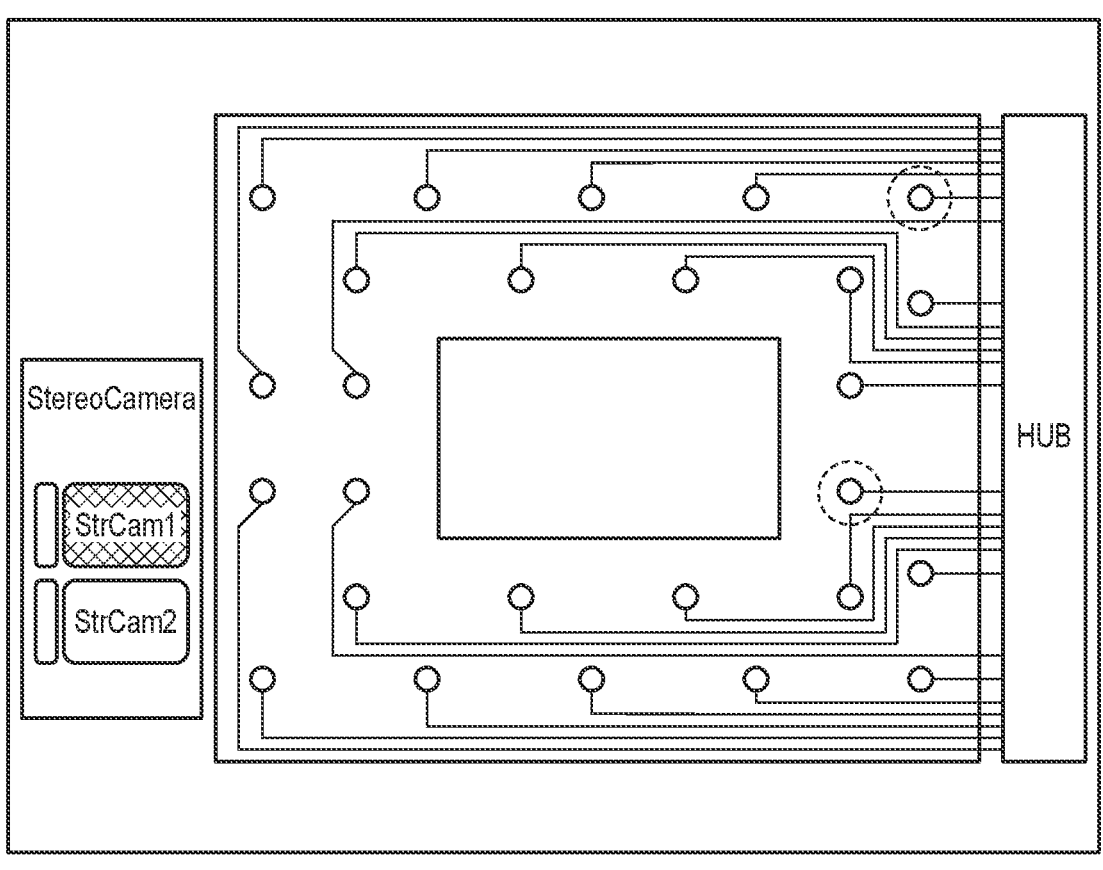

FIG. 18

| STEREO CAMERA ID | IDENTIFICATION INFORMATION 1 | IDENTIFICATION INFORMATION 2 | IDENTIFICATION INFORMATION 3 |
|---|---|---|---|
| StrCam1 | CAMERA 112 | CAMERA 131 | — |
| StrCam1-upd | CAMERA 112 | CAMERA 121 | — |
| StrCam2 | CAMERA 111 | CAMERA 121 | CAMERA 141 |
| ... | ... | ... | ... |

FIG. 19

Caution

StrCam1 are not available due to Cam131 malfunction.
Please select a new camera to combine.

1. Cam121
2. Cam111
3. Cam141

FIG. 20

Information

Angle of view overlap 2002     2001     2003

◁     Cam112     ▷

| No | Camera | Overlap [%] | Status | 2004 |
|---|---|---|---|---|
| 1 | Cam131 | 40 | NG | |
| 2 | Cam121 | 30 | OK | |
| 3 | Cam111 | 20 | OK | |
| 4 | Cam141 | 15 | OK | |
| 5 | Cam122 | 10 | OK | |

F I G. 21
| Caution |
| --- |
| StrCam1 are not available due to Cam131 malfunction.<br>Can I combine it with Cam 121?<br><br>  1. OK<br>  2. NG |
F I G. 22
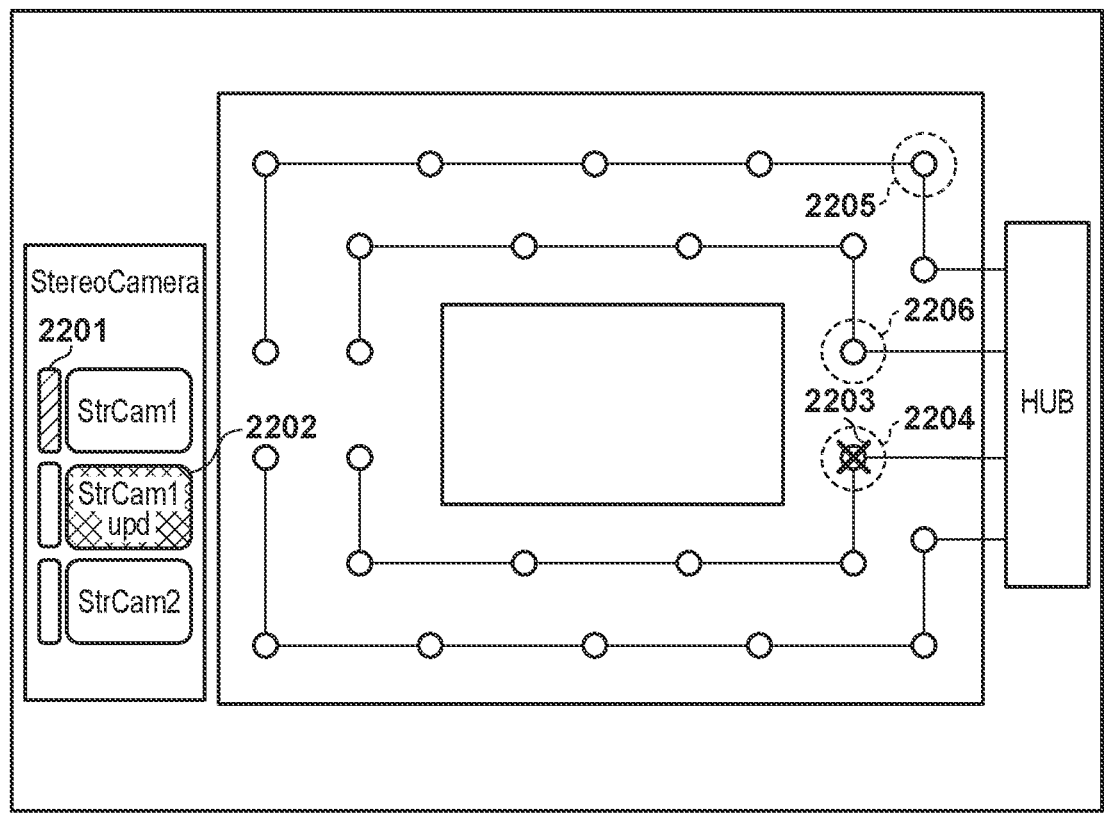

DISPLAY CONTROL APPARATUS, DISPLAY CONTROL METHOD, AND COMPUTER-READABLE STORAGE MEDIUM

BACKGROUND

Field of the Disclosure

The present disclosure relates to a management technique for a system that performs image capturing by operating a plurality of image capturing apparatuses in cooperation with each other.

Description of the Related Art

There is available a multi-camera system that synchronously captures images of an object using a plurality of image capturing apparatuses (cameras) installed at different positions from a plurality of directions and performs image processing such as generating a virtual viewpoint image and a stereoscopic image by using a plurality of images (multi-viewpoint images) obtained by the image capturing. Japanese Patent Laid-Open No. 2008-015863 discloses a technique of generating an accurate three-dimensional model of an object using distance images obtained by image capturing with a plurality of cameras.

A multi-camera system includes many pieces of equipment such as image capturing apparatuses, and hence it is important for the multi-camera system to efficiently manage the pieces of equipment. Japanese Patent Laid-Open No. 2019-088025 discloses a technique of generating and displaying a user interface screen that enables the user to easily recognize the states of a plurality of image capturing apparatuses in a multi-camera system.

It is conceivable that some (two or more) of many image capturing apparatuses included in a multi-camera system are used in cooperation with each other. In such a case, a user interface screen like that disclosed in Japanese Patent Laid-Open No. 2019-088025 does not allow the user to recognize which image capturing apparatuses are cooperatively operating. This can complicate the management of a multi-camera system by the user.

SUMMARY

The present disclosure provides a technique for facilitating the management of a system by the user.

According to one aspect of the present disclosure, there is provided a display control apparatus that performs generation of a user interface (UI) image indicating a system including a plurality of image capturing apparatuses, the image being displayed such that information indicating not less than two image capturing apparatuses, of the plurality of image capturing apparatuses, which perform a predetermined cooperative operation is different in a form from information indicating an image capturing apparatus, of the plurality of image capturing apparatuses, which does not perform the predetermined cooperative operation; and performs control to cause a display to display the image.

Further features of the present disclosure will become apparent from the following description of exemplary embodiments with reference to the attached drawings.

BRIEF DESCRIPTION OF THE DRAWINGS

FIG. 1 is a block diagram showing an example of the arrangement of an image generating system;

FIG. 3 is a block diagram showing an example of the hardware arrangement of an information display apparatus;

FIG. 4 is a block diagram showing an example of the functional arrangement of the information display apparatus;

FIG. 5 is a view showing an example of data held by a data holding unit;

FIG. 6 is a view showing an example of data held by a stereo camera information holding unit;

FIG. 8 is a flowchart showing an example of the procedure of processing executed by the information display apparatus;

FIG. 9 is a view showing an example of screen display when the state of the system is normal;

FIG. 10 is a view showing an example of screen display when an abnormality has occurred in the system;

FIG. 11 is a view showing the second example of screen display when the state of the system is normal;

FIG. 12 is a view showing the second example of screen display when an abnormality has occurred in the system;

FIG. 13 is a view showing the third example of screen display when the state of the system is normal;

FIG. 15 is a view showing the fourth example of screen display when the state of the system is normal;

FIG. 16 is a view showing the fourth example of screen display when an abnormality has occurred in the system;

FIG. 17 is a view showing another example of screen display showing the state of the system;

FIG. 18 is a view showing another example of data held by the stereo camera information holding unit;

FIG. 19 is a view showing an example of screen display at the time of the selection of an alternative camera;

FIG. 20 is a view showing an example of screen display at the time of the selection of an alternative camera;

FIG. 21 is a view showing an example of screen display for an instruction to switch to an alternative camera; and FIG. 22 is a view showing the fifth example of screen display when an abnormality has occurred in the system.

DESCRIPTION OF THE EMBODIMENTS

Figure 2:
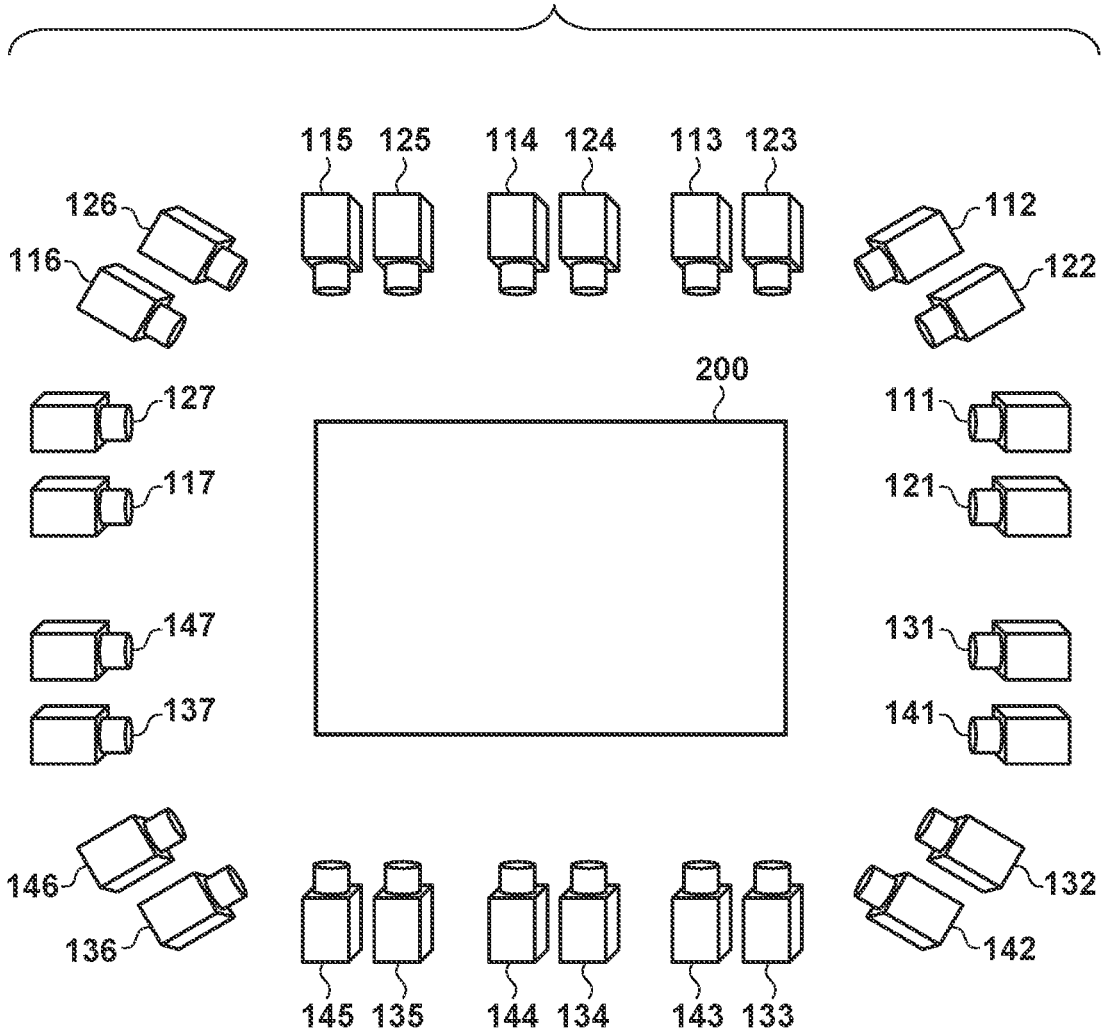
FIG. 2 is a view showing an example of the placement of cameras.

Hereinafter, embodiments will be described in detail with reference to the attached drawings. Note, the following embodiments are not intended to limit the scope of the claimed invention. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

(System Arrangement)

FIG. 1 shows an example of the arrangement of an image generating system according to an embodiment. This image generating system includes, for example, a camera group 100 including a plurality of cameras (image capturing apparatuses) respectively arranged at different positions, an image generating apparatus 160, and an information display apparatus 170.

The camera group 100 includes, for example, many cameras respectively arranged at different positions, as shown in FIG. 2. In the example shown in FIG. 2, the cameras are arranged so as to surround a target region 200 subjected to image capturing and are configured to obtain captured images by executing image capturing of the target region 200 from different directions. The cameras constituting the camera group 100 are, for example, digital cameras.

Alternatively, the cameras may be those that capture still images or those that capture moving images. Alternatively, the cameras may be those that capture both still images and moving images. In this embodiment, the term "image" includes both a still image and a moving image unless otherwise specified. Note that in this embodiment, a combination of an image capturing unit including an image capturing sensor and a lens that focuses light beams on the image capturing sensor will be called a camera.

Referring back to FIG. 1, in the camera group 100 arranged as shown in FIG. 2, seven cameras are daisy chain-connected to form one group. FIG. 1 shows a state in which there are four such groups. That is, the first group includes cameras 111 to 117, the second group includes cameras 121 to 127, the third group includes cameras 131 to 137, and the fourth group includes cameras 141 to 147. The cameras included in the first to fourth groups are connected to a HUB 150 via the cameras 111, 121, 131, and 141. The arrangement in which one group includes seven cameras is merely an example. The number of cameras may be six or less or eight or more. In addition, the number of groups is not limited to four.

The HUB 150 is a hub for mutually connecting the camera group 100, the image generating apparatus 160, and the information display apparatus 170.

The image generating apparatus 160 obtains image data by image capturing with each camera included in the camera group 100 via the HUB 150. The image generating apparatus 160 has a function of generating virtual viewpoint images using, for example, the images captured by the camera group 100. That is, the image generating apparatus 160 obtains multi-viewpoint images obtained by synchronously (at the same timing) executing image capturing from different positions and directions with many cameras included in the camera group 100 and generates virtual viewpoint images based on the multi-viewpoint images. The image generating apparatus 160 extracts a moving object image as a foreground from the multi-viewpoint images, estimates the three-dimensional shape of the object based on data indicating the extracted foreground, and generates a three-dimensional model of the object. The three-dimensional model of the object is generated by using a volume intersection method or the like. Based on the generated three-dimensional model of the object, the image generating apparatus 160 renders an image of the object when the object is seen from a virtual viewpoint position and direction in the virtual space set by the user by using a user interface (UI) (not shown). Note that a virtual viewpoint image according to this embodiment includes an arbitrary viewpoint image (free viewpoint image) corresponding to a viewpoint arbitrarily designated by the user. In addition, the virtual viewpoint image includes an image corresponding to a viewpoint designated from a plurality of candidates by the user and an image corresponding to a viewpoint automatically designated by the apparatus. The UI is a mechanism that accepts an operation by the user, such as a mouse, a keyboard, operation buttons, and a touch panel. The UI may be incorporated in the image generating apparatus 160 or may be provided outside the image generating apparatus 160.

Although this embodiment will exemplify the image generating apparatus 160 as an apparatus that generates a virtual viewpoint image, this is not exhaustive. For example, the image generating apparatus 160 may have a function of generating an image other than a virtual viewpoint image, such as a stereoscopic image and a panoramic image, by using the image data obtained by image capturing with a plurality of cameras at the same timing.

The information display apparatus 170 receives state information from each camera included in the camera group 100 via the HUB 150. The information display apparatus 170 executes control to cause a display apparatus such as a display which the information display apparatus 170 has or is connected to the information display apparatus 170 to display a screen for allowing the user to recognize the state information. The state information includes at least any of, for example, the communication connection state of each camera, the image capturing state of the camera, the output state of the camera, the error/non-error state of the camera, and an image capturing parameter of the camera. In this case, the communication connection state of each camera is, for example, information indicating a communication enable/disable state such as a connected state or non-connection state. In this case, the connected state indicates, for example, a state in which communication can be performed with the camera via the information display apparatus 170. Note that the communication connection state may indicate whether the camera is in a state in which it can communicate with the image generating apparatus 160 without any consideration of whether the camera can communicate with the information display apparatus 170. That is, since it is sufficient to monitor whether each apparatus included in the image generating system can properly operate, even if the camera is not connected to the information display apparatus 170, when the camera can execute communication in the system, the camera may be handled as being in a connected state. The image capturing state of the camera is, for example, information indicating a state such as during image capturing, during preparation, during power OFF, or during power ON. The output state of the camera is information indicating whether image data is being output. The error/non-error state of the camera is, for example, information indicating normality, a temperature error, or a lens error. Image capturing parameters of the camera are, for example, information including an f-number (iris), a shutter speed, a white balance, an ISO sensitivity, a zoom value, a focus value, and an ND filter. In addition, the information display apparatus 170 obtains the installation place of each camera and the connection relation between the cameras from a database and can execute display control to display the obtained information on a screen. This allows the administrator (user) of the system to steadily monitor the state of an image generating system 10 by browsing the information displayed by the information display apparatus 170.

Note that the image generating system 10 may have an arrangement different from that shown in FIG. 1. For example, a plurality of cameras included in the camera group 100 may be directly connected to the image generating apparatus 160 and the information display apparatus 170. The respective cameras included in the camera group 100 may not be daisy chain-connected, and some or all of the cameras may be directly connected to the HUB 150 or the image generating apparatus 160 and the information display apparatus 170. Note that the respective apparatuses may be connected wiredly or wirelessly. In addition, the image generating apparatus 160 and the information display apparatus 170 each may be constituted by a plurality of apparatuses or may be implemented as one apparatus.

In this embodiment, some (two or more) of the cameras included in the camera group 100 operate in cooperation with each other. For example, in generating a virtual viewpoint image, the accuracy of the unevenness expression of a three-dimensional model can be improved by specifying the distance to the object surface using a group of two or more cameras of the plurality of cameras as a stereo camera. Note that in generating a virtual viewpoint image, although all the many cameras belonging to the camera group 100 can be operated in cooperation with each other, a cooperative operation in this embodiment indicates a predetermined cooperative operation of making only some of the many cameras belonging to the camera group 100 operate in cooperation with each other. The predetermined cooperative operation can be used for, for example, an operation other than improving the accuracy of a three-dimensional model in a virtual viewpoint image like that described above. For example, in order to generate one stereoscopic image, it is conceivable to use some of the cameras included in the camera group 100 as a stereo camera in cooperation with each other. This embodiment provides an information presenting technique using the information display apparatus 170 to facilitate the management of two or more cameras used as such a stereo camera.

(Apparatus Arrangement)

An example of the arrangement of the information display apparatus 170 will be subsequently described. FIG. 3 shows an example of the hardware arrangement of the information display apparatus 170. The information display apparatus 170 includes a CPU 301, a ROM 302, a RAM 303, an auxiliary storage apparatus 304, a communication interface (communication I/F) 305, a display apparatus 306, an operation apparatus 307, and a bus 308. The CPU 301 controls the whole information display apparatus 170 by using computer programs and data stored in the ROM 302 and the RAM 303. Note that the information display apparatus 170 has one or a plurality of pieces of dedicated hardware different from the CPU 301 and may cause the dedicated hardware to execute at least part of the processing executed by the CPU 301. The dedicated hardware includes at least any of an application specific integrated circuit (ASIC), a field programmable gate array (FPGA), and a digital signal processor (DSP). The ROM 302 stores programs and parameters that require no change. The RAM 303 temporarily stores programs and data supplied from the auxiliary storage apparatus 304, data externally supplied via the communication I/F 305, and the like. The auxiliary storage apparatus 304 includes, for example, a hard drive and stores various types of content data such as images and sounds. The communication I/F 305 includes a communication circuit for performing wired or wireless communication and is used for communication with an external apparatus such as the camera group 100. When, for example, providing a wired communication function, the communication I/F 305 includes a connector to which a communication cable is connected and a wired communication modem. When providing a wireless communication function, the communication I/F 305 includes an antenna, a radio frequency (RF) chip and a baseband chip. The display apparatus 306 includes a mechanism for performing screen display on a liquid crystal display or an organic EL display. Note that the display apparatus 306 may include a display mechanism other than a display, such as a lamp or a light-emitting diode. Note that the information display apparatus 170 may perform display control for outputting information to an external display apparatus to display a screen. That is, the information display apparatus 170 can be a display control apparatus that executes display control processing for a display apparatus built in the information display apparatus 170 or an external display apparatus. In this case, the information display apparatus 170 can be configured to output information to the external display apparatus via the communication I/F 305. If such an arrangement is used, the display apparatus 306 may be omitted. The operation apparatus 307 includes an operation mechanism including at least any of a keyboard, a mouse, a touch panel, a joystick, and buttons. Note that the operation apparatus 307 may be an interface for accepting operation input information by an external operation accepting apparatus. In addition, the display apparatus 306 and the operation apparatus 307 may be configured as one apparatus in the form of a touch panel display or the like. The bus 308 mutually connects the respective hardware elements of the information display apparatus 170.

FIG. 4 shows an example of the functional arrangement of the information display apparatus 170. The information display apparatus 170 includes, as its functions, for example, a data holding unit 401, a stereo camera information holding unit 402, a data readout unit 403, a state obtaining unit 404, a UI generating unit 405, a display unit 406, a user input unit 407, a control unit 408, and a control signal output unit 409. The data holding unit 401 holds data necessary for the UI generating unit 405 to generate a UI as a display target. This data includes, for example, at least any of the layout data of the target region 200, the identification information of each camera, connection group information to which the camera belongs, the connection destination of the camera, and the installation coordinate information of the camera. The range of the layout data of the target region 200 can be indicated by coordinates with predetermined coordinates (for example, the center of the target region 200) as an origin. The identification information of each camera is information for specifying the camera arranged around the target region 200 with the identification information uniquely assigned to each camera. The connection group information to which the camera belongs is information indicating to which group the camera belongs, with each group being constituted by seven cameras daisy chain-connected in the camera group 100 in FIG. 1. The connection destination of the camera is information indicating the apparatus at the connection destination on the information display apparatus 170 side from the viewpoint of the camera. In the following description, the information display apparatus 170 side from the viewpoint of the camera is sometimes referred to as the "upstream side". The installation coordinate information of the camera is, for example, information indicating the position at which the camera is installed by using a coordinate system used when the layout data of the target region 200 is indicated.

FIG. 5 shows an example of data held by the data holding unit 401. In the example in FIG. 5, the cameras 111 to 117 that are daisy chain-connected belong to a connection group L1. In this example, the cameras 121 to 122 that are daisy chain-connected in another system belong to a connection group L2. In addition, the cameras 111 to 117 are daisy chain-connected such that the camera 116 is placed at the connection destination on the upstream side of the camera 117, the camera 115 is placed at the connection destination on the upstream side of the camera 116, . . . , and the camera 111 is placed at the connection destination on the upstream side of the camera 112. In addition, the camera 111 existing on the most upstream side in the daisy chain is connected to the HUB. When the cameras 111 to 117 are directly connected to the HUB, the connection destination of the cameras is "HUB". An installation position is expressed by a position on an X-Y plane constituted by X-coordinates and Y-coordinates when, for example, the center of the target region 200 is defined as an origin. Referring to FIG. 5, for example, the installation position of the camera 111 is expressed by coordinates (x11, y11). In this case, the installation position of the camera on the X-Y plane is indicated. However, the position of the camera in the height direction may be indicated by introducing Z-coordinates. The data holding unit 401 can obtain these pieces of information in accordance with an operation input from the user. In addition, the data holding unit 401 may obtain these pieces of information as the state information of each camera from the camera. Although FIG. 4 shows an example in which the data holding unit 401 is included in the information display apparatus 170, this is not exhaustive. For example, the data holding unit 401 may be mounted in an external recording apparatus of the information display apparatus 170. Alternatively, the data holding unit 401 may be mounted in each camera as a function of holding information concerning the camera.

The stereo camera information holding unit 402 holds data necessary for the UI generating unit 405 to display a UI concerning the stereo camera. This data includes, for example, a stereo camera ID that is identification information concerning each of a plurality of cameras used as a stereo camera. When a plurality of cameras are used in cooperation with each other as a stereo camera, the stereo camera ID is identification information assigned to a group associating the plurality of cameras. The identification information of each camera is the identification information of each of a plurality of cameras used as a stereo camera corresponding to the one stereo camera ID. FIG. 6 shows an example of data held by the stereo camera information holding unit 402. In the example in FIG. 6, the camera 112 and the camera 131 are used as a stereo camera, and "StrCam1" is assigned as the stereo camera ID. In addition, three cameras, namely, the camera 111, the camera 121, and the camera 141, are used as a stereo camera, and "StrCam2" is assigned as the stereo camera ID. Note that this information is an example, and information concerning a stereo camera may be managed in a form other than the above form. For example, a stereo camera ID may be managed for each camera.

The data readout unit 403 reads out various types of data from the data holding unit 401 and the stereo camera information holding unit 402 and outputs the data to the UI generating unit 405.

The state obtaining unit 404 obtains the state information of each camera. As described above, the state information includes, for example, at least any of the communication connection state of each camera, the image capturing state of the camera, the output state of the camera, the error/non-error state of the camera, and an image capturing parameter of the camera. Note that the state obtaining unit 404 may obtain the state information of the image generating apparatus 160. The state information of the image generating apparatus 160 includes, for example, at least any of a communication connection state, a virtual viewpoint image generation state, an output state, and an error/non-error state. The communication connection state indicates whether the image generating apparatus 160 is connected to the information display apparatus 170 via, for example, a HUB. Note that the communication connection state indicates, for example, whether the image generating apparatus 160 is able to communicate with the camera but may not indicate whether the image generating apparatus 160 is able to communicate with the information display apparatus 170. The virtual viewpoint image generation state indicates a state concerning image generation in the image generating apparatus 160, such as during execution, during preparation, or completion. The virtual viewpoint image generation state may indicate information concerning a CPU load on the image generating apparatus 160 or the like. The output state indicates whether the image generating apparatus 160 is outputting a generated image. The error/non-error state indicates information indicating whether the image generating apparatus 160 is operating normally, a cause of an error such as a temperature error if the apparatus is not operating normally, or the like. Note that the error/non-error state may indicate a state in which an error can occur even though the image generating apparatus 160 is operating normally, for example, the CPU is in a high-temperature state. The state obtaining unit 404 outputs each piece of obtained information to the UI generating unit 405.

The UI generating unit 405 generates a UI image including the states of the system and the cameras and information indicating stereo cameras based on the data output from the data readout unit 403 and the state information output from the state obtaining unit 404. If any of the states has changed, the UI generating unit 405 can generate a UI image exhibiting the change in state. Note that the UI generating unit 405 can monitor whether each change has changed and generate a UI image after a state change. In this case, the data readout unit 403 and the state obtaining unit 404 may determine the presence/absence of a state change and, if there is a state change, transmit a predetermined notification to the UI generating unit 405. In addition, the UI generating unit 405 may periodically obtain data from the data readout unit 403 and the state obtaining unit 404 and generate a UI image based on the latest data. That is, the UI generating unit 405 may generate a UI image based on the latest information without recognizing the presence/absence of a state change. A UI image to be generated will be described later. The UI generating unit 405 outputs the generated UI image to the display unit 406.

The display unit 406 uses a frame buffer and a display panel to store UI image data output from the UI generating unit 405 in the frame buffer. Note that if data is stored in the frame buffer, the display unit 406 overwrites the data in the frame buffer with newly obtained data in response to when data is newly obtained from the UI generating unit 405. The display unit 406 then reads out data stored in the frame buffer at a predetermined refresh rate and displays a UI image on a display panel such as a liquid crystal display. Note that when the information display apparatus 170 causes an external display apparatus to display a UI image, the display unit 406 performs display control to cause the display apparatus to display the UI image.

The user input unit 407 accepts an operation input from the user and generates operation information. The user input unit 407 accepts user operations such as switching display forms (to be described later) and designating cameras when changing a combination of stereo cameras. The user input unit 407 then generates, as operation information, information indicating that such a specific user operation has been performed or information such as coordinates indicating a position on a screen at which a predetermined operation such as a clicking operation is performed on the screen. The user input unit 407 outputs the generated operation information to the control unit 408.

The control unit 408 issues a control instruction to each functional unit of the information display apparatus 170 based on the operation information input from the user input unit 407. For example, upon receiving operation information indicating a display form switching instruction from the user input unit 407, the control unit 408 generates display instruction information between stereo camera arrangement display and normal display in accordance with the operation information. The control unit 408 can transmit the display instruction information to the UI generating unit 405. The control unit 408 can generate a signal for controlling an external apparatus such as the image generating apparatus 160. In this case, the control unit 408 transmits the generated control signal to the control signal output unit 409. The control signal output unit 409 outputs the control signal, input from the control unit 408, for controlling the external apparatus to an apparatus at the destination of the control signal. The control signal output unit 409 can output the control signal to, for example, the image generating apparatus 160 or a predetermined camera in the camera group 100. For example, as described later, if a combination of stereo cameras is changed in accordance with a user instruction, the control unit 408 generates a control signal for notifying the image generating apparatus 160 of combination information before and after the change. The control signal output unit 409 then transmits the control signal to the image generating apparatus 160.

Figure 7:
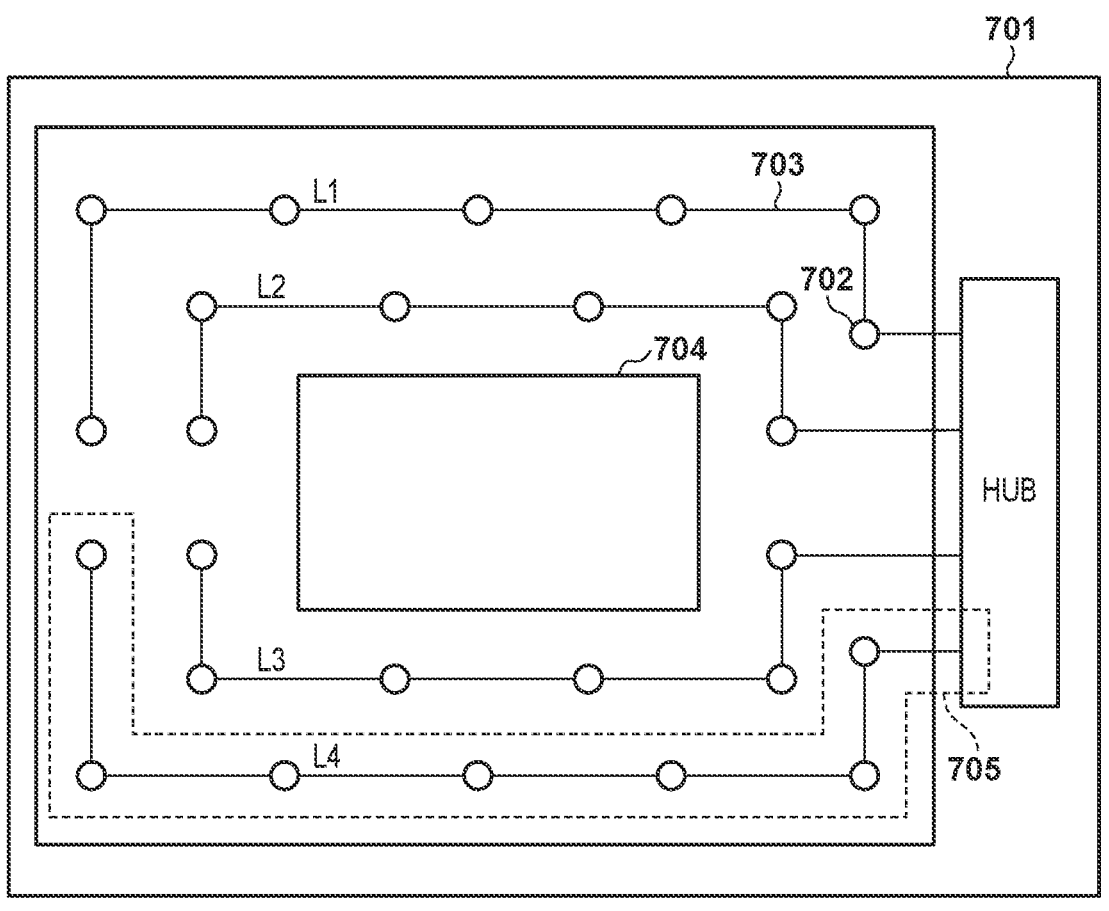
FIG. 7 is a view showing an example of screen display showing the state of a system.

An example of a UI screen generated by the UI generating unit 405 and displayed by the display unit 406 will be described below with reference to FIG. 7. FIG. 7 shows, in a UE screen 701, circles 702 indicating the installation positions and the states of cameras, lines 703 indicating the connection relations and the connection states among the cameras, and a region 704 indicating the target region 200. In this case, the circles are used as marks indicating the cameras, and the lines are used as marks indicating the connections among the cameras. However, marks in forms other than these marks may be used. The circles 702 corresponding to the respective cameras are arranged at predetermined positions within the screen in accordance with the information of "installation position" of each camera of the information shown in FIG. 5. Note that a camera ID may be displayed inside or near the circle 702 to indicate which circle 702 corresponds to which camera. In addition, each camera ID may be displayed on the screen by pop up as needed. In accordance with information in "connection destination" shown in FIG. 5, the line 703 connecting the circle corresponding to a given camera to another circle or the HUB is arranged. Referring to FIG. 7, L1 to L4 each represent information shown as the connection group information shown in FIG. 5. For example, a connection group 705 including the cameras 141 to 147 is rendered as seven circles constituting a daisy chain. Other connection groups L1 to L3 are rendered in a similar manner. The information display apparatus 170 performs such display to allow the user to recognize at a glance information concerning a multi-camera system including a plurality of cameras. In addition, the user can easily recognize the position at which each camera is arranged and the connection destination of the camera. The information display apparatus 170 can also perform display to allow the user to identify cameras in a state ready to perform image capturing and cameras in a state not ready to perform image capturing due to malfunction or maintenance. The information display apparatus 170 can change, for example, the graphic shape indicating a camera in a state not ready to perform image capturing from a circle to a rectangle or the like. In addition, for example, the information display apparatus 170 may black out a circle indicating a camera in a state not ready to perform image capturing. Note that the information display apparatus 170 may display a camera in a state ready to perform image capturing in the form of a rectangle or a blacked out circle and display a camera in a state not ready to perform image capturing with a circle that is not blacked out. That is, a camera may be expressed by any graphic shape as long as the differences in state can be specified. Such display allows the user to easily specify a camera that has malfunctioned. In addition, the user can easily specify the position at which such a camera is arranged. Note that the display example in FIG. 7 indicates an example of normal display including no stereo camera information. An example of display including stereo camera information will be described later.

(Procedure of Processing)

The information display apparatus 170 performs display while switching between normal display like that shown in FIG. 7 and stereo camera arrangement display that allows the user to recognize the arrangement of stereo cameras. This switching processing will be described below.

First of all, the information display apparatus 170 determines whether it has accepted an instruction to display a stereo camera arrangement (S801). For example, the user input unit 407 accepts an input of operation information from a keyboard and outputs the information to the control unit 408. For example, the information display apparatus 170 assigns in advance the "1" key of the 10 keys (ten key pad) of the keyboard to turn-on of stereo camera arrangement display and assigns the "2" key to turn-off (normal display) of stereo camera arrangement display. The information display apparatus 170 then outputs, to the control unit 408, information indicating whether the key pressed by a user operation is "1" or "2". Upon receiving operation information indicating that "1" is pressed, the control unit 408 can specify that an instruction to display a stereo camera arrangement has been accepted. In addition, upon receiving operation information indicating that "2" is pressed, the control unit 408 can specify that a normal display instruction has been accepted. Upon accepting an instruction to display a stereo camera arrangement (YES in S801), the information display apparatus 170 causes the UI generating unit 405 to obtain the state information of all the cameras from the state obtaining unit 404 (S802). The UI generating unit 405 generates a UI image for stereo camera arrangement display based on the obtained state information and causes the display unit 406 to display the UI image (S803). If, for example, there is a camera exhibiting an abnormality in the state information of the camera, the UI generating unit 405 can generate a UI image so as to indicate the occurrence of an abnormality in the camera.

If the information display apparatus 170 has received no instruction to display a stereo camera arrangement (NO in S801), the UI generating unit 405 obtains the state information of all the cameras from the state obtaining unit 404 (S804). If the information display apparatus 170 has not received any instruction, the information display apparatus 170 can determine that it has received no instruction to display a stereo camera arrangement. The UI generating unit 405 determines, based on the obtained state information, whether there is any camera in an abnormal state (S805). If there is no camera in an abnormal state (NO in S805), the UI generating unit 405 generates and displays a normal screen including no stereo camera information, such as the screen shown in FIG. 7 (S808). In contrast, if there is a camera in an abnormal state (YES in S805), the UI generating unit 405 checks the stereo camera arrangement data obtained from the stereo camera information holding unit 402 (S806). The UI generating unit 405 then determines, based on the data, whether a camera in an abnormal state is used as a stereo camera (S807). If a camera in an abnormal state is used as a stereo camera (YES in S807), the UI generating unit 405 generates a UI image for stereo camera arrangement display for displaying stereo camera information (S803). In this case, information indicating that the camera is in an abnormal state can be displayed on another camera used as a stereo camera in combination with the camera in the abnormal state. This allows the user to easily recognize that an abnormality has occurred in the stereo camera function even though the camera itself is normal. In contrast to this, if the UI generating unit 405 determines that a camera in an abnormal state is not used as a stereo camera (NO in S807), the UI generating unit 405 generates and displays a UI screen in a normal display including no stereo camera information (S808). In this case, the camera in the abnormal state is displayed in a form enabling the user to specify that the camera is in the abnormal state, thereby discriminating the camera in the abnormal state from other cameras in the normal state in display. This enables the user to recognize the occurrence of abnormalities in some cameras and at the same time recognize that such cameras are not used as stereo cameras. Note that the processing example in FIG. 8 is merely an example, and even if a camera in an abnormal state is used as a stereo camera, normal display may be performed as long as an instruction to display a stereo camera arrangement has not been accepted by a user operation.

(Stereo Camera Arrangement Display)

Several examples of the display form of a stereo camera arrangement will be subsequently described. Note that the information display apparatus 170 can perform display in any one of the plurality of display forms described below. In addition, the information display apparatus 170 can switch between the display forms. That is, it is possible to perform arbitrary display as long as the user can properly recognize stereo camera information.

FIG. 9 shows the first example of stereo camera arrangement screen display. This screen is displayed based on the reception of an instruction for stereo camera arrangement display. The information display apparatus 170 performs display control on this screen so as to allow the user to easily recognize some cameras of the camera group 100 which are assigned with stereo camera IDs. For such display control, an operation box 901 is prepared on the screen in FIG. 9. The operation box 901 includes information 902 of a stereo camera whose stereo camera ID is set as "StrCam1" and information 904 of a stereo camera whose stereo camera ID is set as "StrCam2". FIG. 9 shows information concerning two stereo cameras set as stereo cameras by the user. However, three or more stereo cameras may be set or only one stereo camera may be set. In addition, the information of a stereo camera, of set stereo cameras, for which information is to be displayed may be limited by user selection. In addition, selecting the information 902 or 904 by user selection will display information that allows the user to specify a stereo camera corresponding to the information. FIG. 9 shows an example in which the information 902 corresponding to StrCam1 is selected by the user via the user input unit 407, and the information 902 is displayed with a background color different from that of the information 904 that is not selected. With this operation, the selected camera 112 and the camera 131 forming stereo cameras corresponding to StrCam1 are displayed with addition of, for example, broken line circles 906 and 907. In contrast to this, no broken line circles are added to the unselected camera 111, the camera 121, and the camera 141 forming stereo cameras corresponding to StrCam2. Checking the broken line circles added so as to surround these cameras enables the user to recognize at a glance the plurality of cameras forming the stereo cameras corresponding to StrCam1.

Note that information indicating a camera belonging to a selected stereo camera may be expressed in a form other than a broken line circle. For example, the size of a circle (for example, the circle 702 in FIG. 7) expressing a camera belonging to a stereo camera may be changed. In an example, the diameter of a circle indicating a camera belonging to a stereo camera can be a predetermined multiple, for example, two times of that of a circle indicating another camera. In addition, for example, the color of a circle expressing a camera may be changed. For example, a circle indicating a camera that does not belong to a stereo camera can be rendered in black, and a circle indicating a camera belonging to the stereo camera may be rendered in red. Note that this is merely an example, and a circle indicating a camera belonging to a stereo camera can be rendered in a color that allows the user to facilitate visual recognition. In addition, a circle indicating a camera belonging to a stereo camera may be changed into another shape such as a rectangle. Alternatively, the transparency of a circle expressing a camera may be changed. For example, the transparency of a circle indicating a camera belonging to a stereo camera may be decreased as compared with a circle indicating another camera so as to be expressed in a dark tone. Alternatively, a circle indicating a camera belonging to a selected stereo camera may be blinked. In addition, for example, when a character string indicating the identification information of a camera is to be displayed around a circle indicating the camera, the display form of the character string of the identification information may be changed. For example, while "camera 113" can be displayed around a circle indicating the camera 113 that does not belong to a stereo camera, "camera 121_StrCam1" can be displayed around a circle indicating the camera 121 belonging to the stereo camera. That is, adding a stereo camera ID to the tail end can indicate that the camera 121 belongs to the stereo camera corresponding to StrCam1. Note that "S1" as an abbreviation of the stereo camera ID may be added to the tail end to display "camera 121_S1". Alternatively, for example, the font used to display the identification information of a camera belonging to a stereo camera may be changed. In addition, the identification information of a camera belonging to a stereo camera may be displayed in boldface. In this manner, a camera belonging to a stereo camera can be displayed in an arbitrary form different from that of a camera that does not belong to the stereo camera.

Information 903 and information 905 indicating whether the corresponding stereo cameras operate normally are displayed beside the information 902 and the information 904 concerning the respective stereo cameras. Referring to FIG. 9, the information 903 is displayed in white, which indicates that the stereo camera corresponding to StrCam1 is operating normally. Referring to FIG. 9, the information 905 of the state concerning unselected StrCam2 is also displayed in white, which indicates that the stereo camera corresponding to StrCam2 is operating normally. This is merely an example, and the information 905 may be displayed in a color indicating an unselected state with respect to unselected StrCam2.

FIG. 10 shows an example of a screen in a case where the camera 131 has made a transition from the display state of the screen shown in FIG. 9 to an abnormal state. Information 1001 indicates that the camera 131 has been in an abnormal state. In this case, since an abnormality has occurred in the camera 131, the stereo camera with stereo camera ID "StrCam1" belonging to the camera 131 begins to malfunction. In order to indicate this state, the information 903 is displayed differently from the normal state by, for example, being changed in display color or being blinked. This allows the user to recognize at a glance the occurrence of an abnormality in the function of the stereo camera with stereo camera ID "StrCam1". At this time, like information 1002, the circle indicating the camera 131 is rendered with a double line different from a normal broken line circuit. In addition, like information 1003, a circle indicating the camera 112 constituting a stereo camera together with the camera 131 is also rendered with a double line different from a normal broken like circle. These pieces of information enable the user to easily recognize that the stereo camera with stereo camera ID "StrCam1" is not operating normally. In addition, the information 1001 enables the user to recognize which of a plurality of cameras displayed in this manner is not operating normally.

FIG. 11 shows the second example of screen display of a stereo camera arrangement. In this example, cameras belonging to a stereo camera ID are displayed at near display positions to allow the user to easily recognize the arrangement of the stereo camera. Referring to FIG. 11, a circle 1101 and a circle 1102 respectively indicate the camera 112 and the camera 131. In this embodiment, moving the position of the circle 1101 corresponding to the camera 112 close to that of the circle 1102 corresponding to the camera 131 will express that the camera 112 and the camera 131 are a combination of cameras belonging to one stereo camera. In addition, a frame 1103 is added to surround the circle 1101 and the circle 1102 corresponding to the camera 112 and the camera 131 forming the stereo camera corresponding to stereo camera ID "StrCam1". In addition, a circle 1104, a circle 1105, and a circle 1106 respectively express the camera 121, the camera 111, and the camera 141. The positions of the circles 1105 and 1106 respectively corresponding to the cameras 111 and 141 are moved close to the circle 1104 corresponding to the camera 121 to express that the camera 111, the camera 121, and the camera 141 belong to one stereo camera. In addition, a frame 1107 is added to surround the circles 1104 to 1106 respectively corresponding to the cameras 111, 121, and 141 forming the stereo camera corresponding to stereo camera ID "StrCam2". As described above, the UI generating unit 405 can move, to the initial display position of a circle corresponding to one camera belonging to a stereo camera, a circle corresponding to another camera belonging to the stereo camera so as to arrange it close to the circle. However, this is not exhaustive. For example, the UI generating unit 405 may display, at a position defined in advance for each stereo camera ID, a circle corresponding to each camera belonging to a stereo camera corresponding to the stereo camera ID. In addition, for example, the UI generating unit 405 can detect an empty space where a circle corresponding to each camera is not displayed and aggregate and display circles corresponding to the respective cameras belonging to a stereo camera by using the empty space. The UI generating unit 405 can display circles corresponding to cameras belonging to a stereo camera close to each other by an arbitrary method other than these methods. In addition, the UI generating unit 405 may dynamically change a UI screen in accordance with the selection of a stereo camera ID so as to display circles indicating cameras belonging to the stereo camera corresponding to the stereo camera ID close to each other.

FIG. 12 shows an example of a screen in a case where the camera 131 has made a transition from the display state of the screen shown in FIG. 11 to an abnormal state. Referring to FIG. 12, information 1201 indicates that the camera 131 is in an abnormal state. In addition, a frame 1202 corresponds to the frame 1103 in FIG. 11 but is rendered with a double line unlike the frame 1103 at the time of a normal operation so as to indicate that the stereo camera corresponding to stereo camera ID "StrCam1" cannot operate normally due to an abnormality in the camera 131. This expression allows the user to easily recognize that the stereo camera function does not operate normally, that is, the plurality of cameras constituting the stereo camera are in a state in which they cannot operate in cooperation with each other. In addition, the user can easily specify an abnormality in a specific camera which has caused an abnormality in the stereo camera function. Note that the shape of the information 1201 indicating that the camera 131 is in the abnormal state and the double line of the frame 1202 which indicates that the stereo camera is in the abnormal state may be other shapes and other types of lines. For example, the information 1201 and the frame 1202 may be changed in color or blinked to indicate an abnormality in a camera itself or the stereo camera.

FIG. 13 shows the third example of screen display of a stereo camera arrangement. In this example, cameras constituting a stereo camera corresponding to each stereo camera ID are displayed in a form like a list 1301. This presents a stereo camera arrangement that can be recognized at a glance by the user. Referring to FIG. 13, the list 1301 is displayed on a lower portion of a camera arrangement diagram 1302. However, the list 1301 may be displayed on an upper portion, a left portion, or a right portion on the camera arrangement diagram 1302. In addition, the list 1301 may be superimposed on a camera arrangement diagram 1302 by using a dynamic window. Alternatively, only the list 1301 may be displayed.

Figure 14:
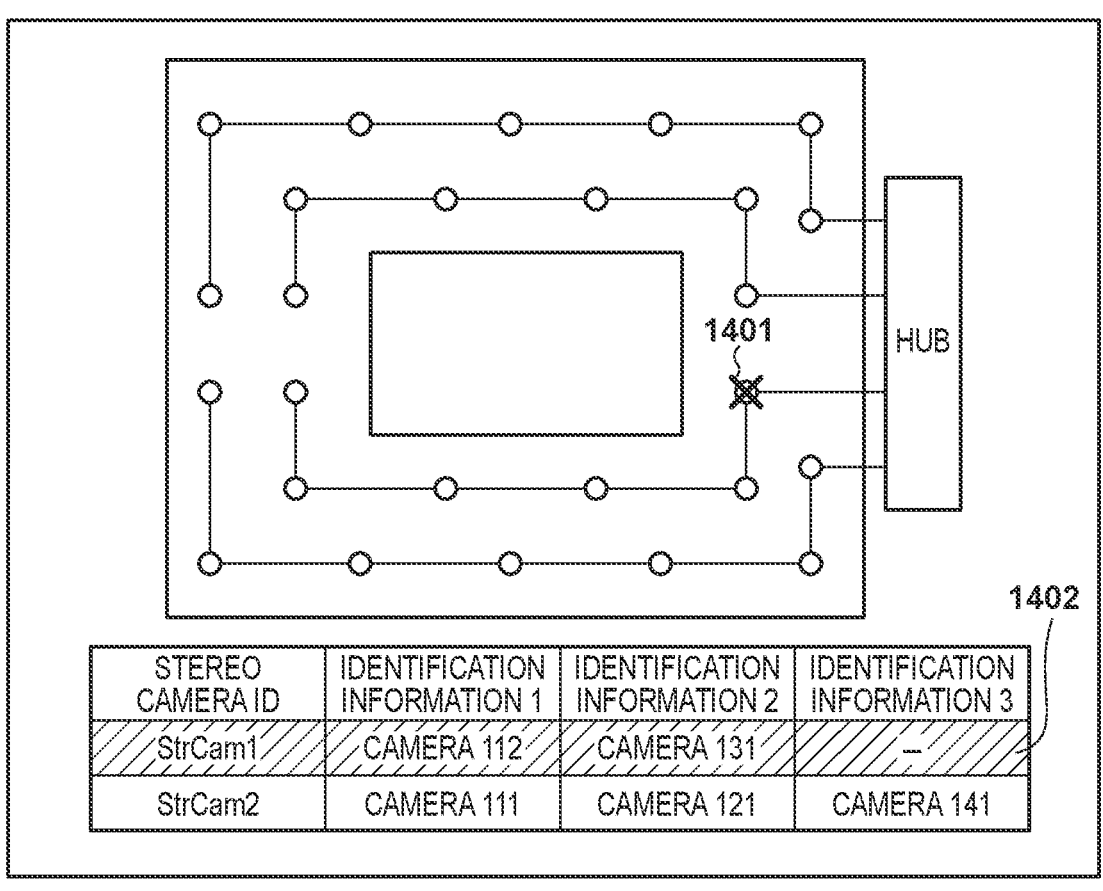
FIG. 14 is a view showing the third example of screen display when an abnormality has occurred in the system.

FIG. 14 shows an example of a screen in a case where the camera 131 has made a transition from the display state of the screen shown in FIG. 13 to an abnormal state. Information 1401 indicates that the camera 131 has been in an abnormal state. Information 1402 indicates that information concerning stereo camera ID "StrCam1" corresponding to the stereo camera using the camera 131 is highlighted in a different color in accordance with the occurrence of an abnormality in the camera 131. That is, the information 1402 indicates that the stereo camera corresponding to stereo camera ID "StrCam1" is not operating normally. This expression enables the user to easily specify a specific camera abnormality that has caused an abnormality in the stereo camera function. Although FIG. 14 shows an example in which the background color of information concerning a stereo camera in an abnormal state is changed, the character color may be changed. Alternatively, the characters may be blinked to indicate the occurrence of the abnormality.

FIG. 15 shows the fourth example of screen display of a stereo camera arrangement. In this example, all the cameras constituting one stereo camera are displayed within a frame with a closed space shape. This allows the user to recognize at a glance the plurality of cameras belonging to the stereo camera. For example, referring to FIG. 15, a frame 1501 is rendered to surround the circles respectively indicating the camera 112 and the camera 131 constituting the stereo camera corresponding to stereo camera ID "StrCam1". Likewise, a frame 1502 is rendered to surround the circles respectively indicating the camera 111, the camera 121, and the camera 141 constituting the stereo camera corresponding to stereo camera ID "StrCam2". This display allows the user to easily recognize the cameras constituting the stereo camera corresponding to each stereo camera ID. Referring to FIG. 15, the frames 1501 and 1502 are indicated by broken lines. However, these frames may be expressed in other forms such as solid lines and double lines. In addition, a plurality of circles respectively indicating a plurality of cameras constituting the same stereo camera may be displayed so as to be connected to each other by special lines. For example, if the physical connection relation between the respective cameras is indicated by black lines, a plurality of cameras constituting one stereo camera may be connected to each other by red lines.

FIG. 16 shows an example of a screen in a case where the camera 131 has made a transition from the display state of the screen shown in FIG. 15 to an abnormal state. Referring to FIG. 16, information 1601 indicates that the camera 131 is in an abnormal state. A frame 1602 corresponds to the frame 1501 in FIG. 15 but is rendered with a double line unlike the frame 1501 at the time of a normal operation to indicate that the stereo camera corresponding to stereo camera ID "StrCam1" cannot operate normally due to an abnormality in the camera 131. This expression enables the user to easily specify that the stereo camera function does not operate normally and the abnormality in the stereo camera is caused by an abnormality in a specific camera. Note that the shape of the information 1601 indicating that the camera 131 is in the abnormal state and the double line of the frame 1602 which indicates that the stereo camera is in the abnormal state may be other shapes and other types of lines. For example, the information 1601 and the frame 1602 may be changed in color or blinked to indicate an abnormality in a camera itself or the stereo camera.

Each example described above has exemplified the case where the cameras are daisy chain-connected to each other. However, for example, even if the respective cameras are directly star-connected to the HUB, it is possible to perform display like each example described above. FIG. 17 shows an example of a screen in a case where stereo camera arrangement display similar to that in FIG. 9 is performed while the cameras are star-connected to the HUB. The other display examples can also be applied to a case where cameras are start-connected. Note that the connection methods for cameras are not limited to daisy chain connection and star connection, and some cameras may be directly connected to the HUB while the remaining cameras may be connected to the HUB via other cameras. In addition, the HUB is an example of the connection destination of a camera. When cameras are directly connected to the image generating apparatus 160, "HUB" may be replaced with "image generating apparatus". Alternatively, "HUB" may be omitted on the UI screen. Obviously, the screen display method corresponding to each example described above can be applied to each of these cases.

In the above manner, in the multi-camera system in which some (two or more) of many cameras operate as a stereo camera in cooperation with each other, the user can easily check the cameras used as the stereo camera. The above display allows the user to easily recognize, when an abnormality has occurred in a camera, on which stereo camera the abnormality has an influence.

According to the above example, ON/OFF of stereo camera display is determined in accordance with a user input. However, this is not exhaustive. For example, stereo camera arrangement display may be always performed. In the above example, although the information display apparatus 170 displays a two-dimensional screen as an example of a UI screen, this is not exhaustive. For example, a stereoscopic camera arrangement may be indicated by using computer graphics, and stereo camera arrangement display may be performed on the screen in the above manner. In addition, the above description has exemplified the case of displaying the overall state of the camera group 100 included in the system. However, only part of the camera group 100 may be displayed by, for example, an enlarging operation. In this case, only when circles (marks) indicating cameras constituting a stereo camera are displayed, additional information indicating the cameras belonging to the stereo camera can be displayed. However, this is merely an example. For example, in the arrangement shown in FIG. 13, even if circles indicating cameras constituting a stereo camera are not displayed, additional information indicating the cameras belonging to the stereo camera can be displayed. In addition, according to the above processing example described above, additional information indicating the occurrence of an abnormal state is displayed with respect to cameras operating as a stereo camera. However, it is possible to also indicate the occurrence of an abnormal state with respect to cameras that are not operating as a stereo camera by using a similar method. In addition, the above display examples may be combined.

(Change of Cameras Constituting Stereo Camera)

If an abnormality has occurred in a camera used as a stereo camera, another camera may be used to constitute a stereo camera in place of the camera in which the abnormality has occurred. In this case, the UI generating unit 405 may generate a UI screen displaying that such alternative cameras are used to form a stereo camera.

FIG. 18 shows an example of data held by the stereo camera information holding unit 402 when a stereo camera is formed by using such an alternative camera. In this example, an abnormality has occurred in "camera 131" corresponding to stereo camera ID "StrCam1", and new stereo camera ID "StrCam1-upd" is generated. The stereo camera corresponding to stereo camera ID "StrCam1-upd" uses "camera 121" in place of "camera 131". Note that an alternative camera can be selected by a user operation.

As shown in FIG. 19, the UI generating unit 405 may generate and display a screen that prompts the user to select a camera to be actually used as an alternative camera by listing cameras determined in advance as alternative camera candidates. The user determines one camera as an alternative camera by inputting a numerical key corresponding to any of numerals assigned to candidate cameras. Note that inputting a numerical key is an example, and a user selection may be accepted by another method. For example, buttons respectively corresponding to alternative camera candidates may be displayed on a screen, and the user may determine an alternative camera by clicking any of the buttons by a mouse operation. Alternatively, the user may determine an alternative camera by uttering information such as a numeral indicating any of candidate cameras and recognizing the utterance by speech recognition.

Note that, for example, as shown in FIG. 20, the UI generating unit 405 may generate a UI screen that prompts the user to select an alternative camera by presenting the angle of view overlap ratios of cameras that can be used in combination with each other in a stereo camera and may cause the display unit 406 to display the UI screen. In this case, information 2001 indicates the name of a camera that is free from abnormality and used in combination with an alternative camera in a stereo camera. A button 2002 is a button that accepts an operation of switching to a camera immediately before the currently displayed camera as a camera to be used in combination with the alternative camera. A button 2003 is a button that accepts an operation of switching to a camera immediately after the currently displayed camera as a camera to be used in combination with the alternative camera. Information 2004 is information that indicates the candidates of alternative cameras each of which can be used as a stereo camera in combination with the camera indicated by the information 2001 in the form of a list. Note that the information 2004 indicates, as an overlap ratio, the size of a region where the angle of view of the alternative camera at the time of image capturing overlaps the angle of view of the camera indicated by the information 2001. Although FIG. 20 shows the candidates of alternative cameras in the form of a list in descending order of overlap ratios, this is not exhaustive. For example, the candidates of alternative cameras may be displayed in order from the camera positioned physically nearest to the camera indicated by the information 2001. Alternatively, the candidates of alternative cameras may be displayed in order of the iden- tification information of each camera. That is, the display order of the candidates of alternative cameras in a list can be determined by an arbitrary rule.

In an example, since an abnormality has occurred in the camera 131 of the cameras constituting the stereo camera with stereo camera ID "StrCam1", another camera consti- tuting a stereo camera in combination with the camera 112 is designated. In this case, the information 2001 indicates the camera 112. The information 2004 presents the cameras in descending order of the sizes of the regions where the angle of view of the camera 112 overlaps the angles of view of the cameras. In this case, since only the camera 112 constitutes a stereo camera together with the camera 131 in which an abnormality has occurred, the information 2001 does not indicate cameras other than the camera 112. Accordingly, the button 2002 and the button 2003 may be invalidated.

Referring to FIG. 20, "Overlap" indicates an angle of view overlap ratio, and "Status" indicates the state of a camera. The angle of view overlap ratio of each camera is calculated by using, for example, a calibration parameter representing the posture or orientation of each camera. FIG. 20 shows that the camera 131 exhibits the highest angle of view overlap ratio with respect to the camera 112. Accord- ingly, when no abnormality has occurred in the camera 131, the camera 131 is used as a stereo camera together with the camera 112. Referring to FIG. 20, since the camera 131 is in an abnormal state, "Status" of the camera 131 is displayed as "NG". This enables the user to select an alternative camera by referring to, for example, the overlap ratios. For example, the user can select a camera used as an alternative camera by referring to overlap ratio information and input- ting a numerical key of the keyboard. Although FIG. 20 shows the candidates of alternative cameras in descending order of angle of view overlap ratio, this is not exhaustive. For example, the candidates of alternative cameras may be presented in order from a predefined and recorded list.

In addition, an alternative camera may be automatically determined instead of being determined based on a user instruction. For example, a normal camera that exhibits the highest angle of view overlap ratio with respect to a normal camera constituting a stereo camera may be automatically selected as an alternative camera. In this case, a message inquiring whether to switch to an alternative camera is presented to the user, and switching to an alternative camera can be performed in accordance with the approval to switch to an alternative camera by the user. FIG. 21 shows a display example of a message inquiring the user whether to switch to an alternative camera. FIG. 21 shows an example of a message checking whether the camera 121 exhibiting the highest angle of view overlap ratio with the camera 112 next to the camera 131 may be used as an alternative camera of the camera 131 based on the detection of an abnormality in the camera 131. When such a message is presented, the user can instruct whether to permit switching of cameras by, for example, inputting a numerical key of the keyboard. After permission to switch cameras is accepted from the user, a camera constituting the stereo camera is changed. Although the above description has exemplified the case where switching to an alternative camera is performed after an instruction is accepted from the user, this is not exhaustive. For example, switching to an alternative camera may be automatically performed, and a message indicating the alter- native camera after the switching may be presented to the user. That is, a message informing the user of automatic switching may be presented without the presentation of a message inquiring the user whether to permit switching to an alternative camera.

FIG. 22 shows an example of a screen in a case where the camera 131 has made a transition from the display state of the screen shown in FIG. 9 to an abnormal state, and an alternative camera is to be used. In this example, when an abnormality has occurred in the camera 131, the camera 121 is used as an alternative camera. Information 2201 indicates that the stereo camera with stereo camera ID "StrCam1" has malfunctioned upon occurrence of an abnormality in the camera 131. Information 2202 indicates that a stereo camera function is implemented by a new combination of cameras as an alternative of stereo camera ID "StrCam1". At this time, the information of StrCam1 is displayed in a color different from that at the time of a normal operation or grayed out to indicate that the stereo camera with stereo camera ID "StrCam1" malfunctions. In a case where the information of an unselected stereo camera is grayed out, and the information of a stereo camera that malfunctions is also grayed out, the information of the stereo camera that malfunctions may be made more grayed. Obviously, display in another form may also be performed. The information 2202 can be displayed at the timing when the stereo camera with stereo camera ID "StrCam1" has malfunctioned. Alter- natively, the information 2202 may be always displayed. Information 2203 indicates that the camera 131 is in an abnormal state. A broken line circle 2204 surrounding a circle corresponding to the camera 131 indicates that the camera 131 that has been used as a stereo camera is not currently used as a stereo camera because of the occurrence of an abnormality. Broken line circles 2205 and 2206 surrounding circles corresponding to the cameras 112 and 121 indicate that the cameras 112 and 121 are used as a stereo camera with stereo camera ID "StrCam1-upd". Note that the circle 2204 can be displayed while, for example, its color, shape, size, and transparency are changed to discrimi- nate the circle from the circles 2205 and 2206.

As described above, in a case where an abnormality has occurred in a camera used as a stereo camera, and an alternative camera is to constitute a stereo camera, the user can easily recognize the situation. In addition, the user can accurately and quickly recognize the current condition of the function of a stereo camera using an alternative camera. The above has exemplified the method of determining, upon occurrence of an abnormality in any of cameras constituting a stereo camera, an alternative camera used in place of the camera in which the abnormality has occurred. This method can be used for changing of a camera in which no abnor- mality has occurred. That is, for example, some or all of the cameras constituting a stereo camera may be changed in accordance with a user's intention. For example, while one of the cameras constituting a stereo camera is left unchanged, it is possible to accept the user's selection of a camera to be used in cooperation with the one of the cameras by using screen display like that shown in FIG. 20.

The above example shows an example of a UI image indicating the state of a camera group used by the image generating apparatus 160. However, the state of the image generating apparatus 160 may also be indicated. This enables the user to easily recognize the overall state of the image generating system.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-048617, filed Mar. 24, 2023 which is hereby incorporated by reference herein in its entirety.

What is claimed is:

1. A display control apparatus comprising:
one or more processors; and
one or more memories that stores a computer-readable instruction for causing, when executed by the one or more processors, the one or more processors to:
perform generation of a user interface (UI) image indicating a system including a plurality of image capturing apparatuses, the image being displayed such that information indicating not less than two image capturing apparatuses, of the plurality of image capturing apparatuses, which perform a predetermined cooperative operation is different in a form from information indicating an image capturing apparatus, of the plurality of image capturing apparatuses, which does not perform the predetermined cooperative operation; and
perform control to cause a display to display the image,
wherein the system is a system configured to generate a virtual viewpoint image using the plurality of image capturing apparatuses, the plurality of image capturing apparatuses are used to generate a three-dimensional model of an object, and not less than the two image capturing apparatuses of the plurality of image capturing apparatuses perform image capturing including specifying a distance to a surface of the object as the predetermined cooperative operation.

2. The apparatus according to claim 1, wherein, in the generation, the display control apparatus generates the image indicating graphic shapes respectively indicating the plurality of image capturing apparatuses and connection relations between the plurality of image capturing apparatuses and other apparatuses and including additional information respectively surrounding graphic shapes indicating not less than the two image capturing apparatuses.

3. The apparatus according to claim 1, wherein, in the generation, the display control apparatus generates the image indicating a graphic shape indicating each of the plurality of image capturing apparatuses and connection relations between the plurality of image capturing apparatuses and other apparatuses, with the graphic shapes indicating not less than the two image capturing apparatuses being rendered differently from a graphic shape indicating another image capturing apparatus that does not perform the predetermined cooperative operation.

4. The apparatus according to claim 3, wherein, in the generation, the display control apparatus generates the image rendered to make graphic shapes of not less than the two image capturing apparatuses differ in size, color, shape, or transparency from other image capturing apparatuses that do not perform the predetermined cooperative operation.

5. The apparatus according to claim 1, wherein, in the generation, the display control apparatus generates the image rendered to indicate graphic shapes respectively indicating the plurality of image capturing apparatuses, character strings indicating identification information of the plurality of image capturing apparatuses, and a connection relation between the plurality of image capturing apparatuses and other apparatuses and make a display form of the character strings concerning not less than the two image capturing apparatuses differ from a display form of the character strings concerning other image capturing apparatuses that do not perform the predetermined cooperative operation.

6. The apparatus according to claim 5, wherein, in the generation, the display control apparatus generates the image by rendering character strings obtained by adding a character string of identification information corresponding to a combination of not less than the two image capturing apparatuses to a character string of identification information of each of not less than the two image capturing apparatuses or a character string differing in font from character strings concerning other image capturing apparatuses that do not perform the predetermined cooperative operation as the character strings concerning not less than the two image capturing apparatuses.

7. The apparatus according to claim 1, wherein, in the generation, the display control apparatus generates the image rendered to indicate graphic shapes respectively indicating the plurality of image capturing apparatuses and connection relations between the plurality of image capturing apparatuses and other apparatuses and display the graphic shapes concerning not less than the two image capturing apparatuses close to each other as compared with a case where not less than the two image capturing apparatuses do not perform the predetermined cooperative operation.

8. The apparatus according to claim 1, wherein, in the generation, the display control apparatus generates the image indicating graphic shapes respectively indicating the plurality of image capturing apparatuses and connection relations between the plurality of image capturing apparatuses and other apparatuses and displaying information of not less than the two image capturing apparatuses that perform the predetermined cooperative operation in a list form.

9. The apparatus according to claim 1, wherein, in the generation, the display control apparatus generates the image rendered to indicate graphic shapes respectively indicating the plurality of image capturing apparatuses and connection relations between the plurality of image capturing apparatuses and other apparatuses and display a frame collectively surrounding the graphic shapes concerning the not less than the two image capturing apparatuses.

10. The apparatus according to claim 1, wherein, in the generation, the display control apparatus generates the image rendered to indicate graphic shapes respectively indicating the plurality of image capturing apparatuses and a connection relation between the plurality of image capturing apparatuses and other apparatuses and display a line connecting the graphic shapes concerning the not less than the two image capturing apparatuses.

11. The apparatus according to claim 1, wherein, in the generation, the display control apparatus generates the image displaying, in a case where there is a combination of not less than the two image capturing apparatuses that perform the predetermined cooperative operation, information indicating not less than the two image capturing apparatuses included in a combination selected by a user in a form different from information indicating an image capturing apparatus that does not perform the predetermined cooperative operation and displaying information indicating not less than the two image capturing apparatuses included in a combination that is not selected by the user in the same form as information indicating an image capturing apparatus that does not perform the predetermined cooperative operation.

12. The apparatus according to claim 1, wherein, in the generation, the display control apparatus generates, based on a fact that any of the plurality of image capturing apparatuses is in an abnormal state, the image indicating additional information indicating that the image capturing apparatus is in the abnormal state.

13. The apparatus according to claim 12, wherein, in the generation, the display control apparatus generates the image further displaying information indicating that not less than the two image capturing apparatuses cannot perform the predetermined cooperative operation based on a fact that any of not less than the two image capturing apparatuses that perform the predetermined cooperative operation is in an abnormal state.

14. The apparatus according to claim 12, wherein the computer-readable instruction causes, when executed by the one or more processors, the one or more processors to obtain information indicating a state of each of the plurality of image capturing apparatuses.

15. The apparatus according to claim 1, wherein, in the generation, the display control apparatus generates a screen configured to accept a change in a combination of not less than the two image capturing apparatuses that perform the predetermined cooperative operation such that an overlap ratio between an angle of view in image capturing by one image capturing apparatus of not less than the two image capturing apparatuses and an angle of view in image capturing by another image capturing apparatus that can be used in combination with the one image capturing apparatus is shown, and in a case where a user operation indicating a change in a combination of not less than the two image capturing apparatuses that perform the predetermined cooperative operation is accepted on the screen, the image after the change is generated.

16. The apparatus according to claim 1, wherein the computer-readable instruction causes, when executed by the one or more processors, the one or more processors to select, in a case where a combination of not less than the two image capturing apparatuses that perform the predetermined cooperative operation is to be changed, an image capturing apparatus that performs the predetermined cooperative operation with one image capturing apparatus of not less than the two image capturing apparatuses from other image capturing apparatuses that can perform the predetermined cooperative operation with the one image capturing apparatus based on overlap ratios between an angle of view in image capturing by the one image capturing apparatus and angles of view in image capturing by the other image capturing apparatuses.

17. A display control method executed by a display control apparatus, the method comprising:

generating a user interface (UI) image indicating a system including a plurality of image capturing apparatuses, the image being displayed such that information indicating not less than two image capturing apparatuses, of the plurality of image capturing apparatuses, which perform a predetermined cooperative operation is different in a form from information indicating an image capturing apparatus, of the plurality of image capturing apparatuses, which does not perform the predetermined cooperative operation; and performing control to cause a display to display the image, wherein the system is a system configured to generate a virtual viewpoint image using the plurality of image capturing apparatuses, the plurality of image capturing apparatuses are used to generate a three-dimensional model of an object, and not less than the two image capturing apparatuses of the plurality of image capturing apparatuses perform image capturing including specifying a distance to a surface of the object as the predetermined cooperative operation.

18. A non-transitory computer-readable storage medium that stores a program for causing a computer included in a display control apparatus to execute a display control method, the display control method comprising:

generating a user interface (UI) image indicating a system including a plurality of image capturing apparatuses, the image being displayed such that information indicating not less than two image capturing apparatuses, of the plurality of image capturing apparatuses, which perform a predetermined cooperative operation is different in a form from information indicating an image capturing apparatus, of the plurality of image capturing apparatuses, which does not perform the predetermined cooperative operation; and performing control to cause a display to display the image, wherein the system is a system configured to generate a virtual viewpoint image using the plurality of image capturing apparatuses, the plurality of image capturing apparatuses are used to generate a three-dimensional model of an object, and not less than the two image capturing apparatuses of the plurality of image capturing apparatuses perform image capturing including specifying a distance to a surface of the object as the predetermined cooperative operation.

\* \* \* \* \*